US012757081B2

(12) United States Patent
Callender et al.

(10) Patent No.: US 12,757,081 B2
(45) Date of Patent: Oct. 6, 2026

(54) SWITCHING DELAY CONTROL IN A DUAL-ACTIVE PROTOCOL STACK HANDOVER

(71) Applicant: Telefonaktiebolaget LM Ericsson (publ), Stockholm (SE)

(72) Inventors: Christopher Callender, Kinross (GB); Christian Bergljung, Lund (SE); Magnus Sandgren, Staffanstorp (SE); Magnus Larsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 529 days.

(21) Appl. No.: 18/271,127

(22) PCT Filed: Jan. 13, 2022

(86) PCT No.: PCT/EP2022/050691
§ 371 (c)(1),
(2) Date: Jul. 6, 2023

(87) PCT Pub. No.: WO2022/152816
PCT Pub. Date: Jul. 21, 2022

(65) Prior Publication Data

US 2024/0056912 A1 Feb. 15, 2024

Related U.S. Application Data

(60) Provisional application No. 63/137,321, filed on Jan. 14, 2021.

(51) Int. Cl.

| | |
|---|---|
| ***H04W 36/00*** | (2009.01) |
| ***H04L 5/14*** | (2006.01) |
| ***H04W 36/18*** | (2009.01) |

(52) U.S. Cl.
CPC ....... *H04W 36/0069* (2018.08); *H04L 5/1438* (2013.01); *H04W 36/185* (2023.05)

(58) Field of Classification Search
None
See application file for complete search history.

(56) References Cited

U.S. PATENT DOCUMENTS

| | | | | |
|---|---|---|---|---|
| 12,477,412 B2 * | 11/2025 | Yan | .................. | H04W 36/0061 |
| 2015/0117399 A1 * | 4/2015 | Yang | ................ | H04W 36/0069 370/331 |

(Continued)

OTHER PUBLICATIONS

3GPP, "3rd Generation Partnership Project; Technical Specification Group Radio Access Network; NR; Physical layer measurements (Release 16)", 3GPP TS 38.215 V16.4.0, Dec. 2020, 1-25.

(Continued)

*Primary Examiner* — Kodzovi Acolatse
(74) *Attorney, Agent, or Firm* — Murphy, Bilak & Homiller, PLLC

(57) ABSTRACT

An example method according to some of the techniques described below is performed by a device operating in a wireless network, where the device could be a UE or a network node, e.g., an NR gNB. This example method includes the step of determining (610) whether a receive-to-transmit or transmit-to-receive switching limitation of a UE can be met during a dual-active protocol stack handover for the UE from a source cell to a target cell. The method further includes the step of taking one or more mitigation actions (620) in response to said determining. Mitigation actions might include, for example, stopping a downlink reception early or starting a scheduled transmission late, in various embodiments or instances.

21 Claims, 12 Drawing Sheets

(56) References Cited

U.S. PATENT DOCUMENTS

| | | | | |
|---|---|---|---|---|
| 2020/0008186 | A1* | 1/2020 | Kim | H04L 5/0051 |
| 2020/0314716 | A1 | 10/2020 | Kim et al. | |
| 2023/0108413 | A1* | 4/2023 | You | H04W 76/15 370/329 |
| 2023/0262561 | A1* | 8/2023 | Lin | H04W 36/0072 370/331 |

OTHER PUBLICATIONS

3GPP , "3rd Generation Partnership Project; Technical Specification Group Radio Access Network; NR; Requirements for support of radio resource management (Release 16)", 3GPP TS 38.133 V16.5.0, Sep. 2020, 1-1608.

Unknown, Author , "Correction on the synchronous condition for DAPS handover", 3GPP TSG-RAN WG4 Meeting #97-e, R4-2015502, Electronic Meeting, Nov. 2-13, 2020, 1-4.

Unknown, Author , "Email discussion summary for [97e][227] LTE feMob RRM", 3GPP TSG-RAN WG4 Meeting #97-e, R4-2017026, Electronic Meeting, Nov. 2-13, 2020, 1-7.

Unknown, Author , "WF on NR Mobility Enhancements RRM", 3GPP TSG-RAN WG4 Meeting #97-e, R4-2017093, Electronic Meeting, Nov. 2-13, 2020, 1-6.

* cited by examiner

EXAMPLE TARGET UL TRANSMIT TIMING

NTA-SOURCE: KNOWN AND DEFINED UPLINK TIMING FOR SOURCE AND RELATES TO SOURCE DL
Tprop_S – NTA-source/2

SWITCHING DELAY CONTROL IN A DUAL-ACTIVE PROTOCOL STACK HANDOVER

TECHNICAL FIELD

The present disclosure is generally related to a dual-active protocol stack handover in a wireless communications network and is more particularly related to mitigating limitations on receive-to-transmit and transmit-to-receive switching times during such a handover.

BACKGROUND

Dual-active protocol stack (DAPS) handover has been standardized in Release 16 of the 3$^{rd}$-Generation Partnership Project (3GPP) specifications for both LTE and NR radio access technologies. The basic idea of a DAPS handover is shown in FIG. 1.

During a DAPS handover, a user equipment (UE) is connected to both source and target cells simultaneously and (depending on UE capabilities) may transmit and receive to both cells concurrently. A main purpose of DAPS handover is to reduce data interruption during handover, since the connection to the source cell is maintained, in principle, while the connection to the target cell is started. Once connection to the target cell has been established, the source cell may be released by the eNB/gNB, i.e., the source cell is released under network control.

There are different variants of DAPS handover including:

1. Intra-frequency DAPS handover: This is specified by the 3GPP RAN4 working group for NR as "A DAPS handover is intra frequency if the centre frequency of the SSB of the source cell and the centre frequency of the SSB of the target cell are the same, and the subcarrier spacing of the two SSBs are also the same."
2. Inter-frequency intra-band DAPS handover: This is any DAPS handover between cells on the same band which do not meet the conditions of an intra-frequency DAPS handover
3. Inter-band DAPS handover: This is a DAPS handover with source and target cells on different bands.

In addition, a DAPS handover may be characterized as synchronous or asynchronous. Different UEs may have different capabilities with respect to DAPS handover, e.g., a certain UE implementation may indicate that it is able to support synchronous DAPS handover only, in a certain case.

The conditions for a DAPS handover to be considered as synchronous are defined by 3GPP in 3GPP TS 38.133 (v16.5.0), in Table 6.1.3.2-1, which lists "Sync conditions for FR1 DAPS handover" and which is reproduced below in Table 1.

TABLE 1

| Type of handover | Maximum receive timing difference between source and taget cell (μs) for sync DAPS handover | Maximum transmit timing difference between source and taget cell (μs) for sync DAPS handover |
|---|---|---|
| Intra-frequency$^{Note\ 1,2,3}$ | 6 μs | 7.6 μs |
| Intra-band inter-frequency$^{Note\ 1,2,3}$ | 6 μs | 7.6 μs |
| Inter-band inter-frequency | 33 μs | 34.6 μs |

*Note 1*

For synchonous DAPS handover, if the receive time difference exceeds the cyclic prefix length of that SCS, demodulation performance degradation is expected for the first symbol of the slot. Editor note: how to capture the performance degradation for asynchronous cases needs to be further studied

*Note 2*

For DAPS handover on a TDD band, a UE is not expected to transmit in the uplink earlier than $N_{RX\text{-}TX}$ after the end of the last received downlink symbol in the same cell where $N_{RX\text{-}TX}$ = 26500Tc.

*Note 3*

For DAPS handover on a TDD band, a UE is not expected to receive in the downlink earlier than $N_{TX\text{-}RX}$ after the end of the last transmitted uplink symbol in the same cell where $N_{TX\text{-}RX}$ = 26500Tc.

An assumption used in deriving the requirements is that at least synchronous intra-frequency DAPS handover, and intra-band inter-frequency DAPS handover can be implemented with a single receiver and transmitted chain, or at least using shared radiofrequency (RF) components between the RF hardware that receives/transmits to the source cell and the RF hardware that receives/transmits to the target cell.

Of interest are notes 2 and 3 in the table above, which give conditions for receive-to-transmit (RX-TX) and transmit-to-receive (TX-RX) switching times for time-division duplexing (TDD) operation. Although Table 1 above is copied from v16.5.0 of 3GPP TS 38.133, the text is acknowledged to need updating, and 3GPP has discussed multiple options to revise the text along with corresponding rewording of note 2 & 3. This is documented in 3GPP discussion document R4-2017093, which includes the following:

----------------------------begin excerpt from 3GPP document-------------------------------

Issue 1-3: further clarification on DL-to-UL and UL-to-DL switching time

Option 1: clarify that 13us switching time is allowed between source cell and target cell:

Note 2: For DAPS handover on a TDD band, a UE is not expected to transmit in the uplink to source or target cell earlier than $N_{TX\text{-}RX}$ after the end of the last received downlink symbol from source or target cell in the same TDD band where $N_{RX\text{-}TX}$=25600Tc.

Note 3: For DAPS handover on a TDD band, a UE is not expected to receive in the downlink from source or target cell earlier than $N_{TX\text{-}RX}$ after the end of the last transmitted uplink symbol toward source or target cell in the same TDD band where $N_{TX\text{-}RX}$=25600Tc.

Option 2: Retain the existing specification that DL-to-UL and UL-to-DL switching time applies within the same cell Note 2: For DAPS handover on a TDD band, a UE is not expected to transmit in the uplink earlier than $N_{TX\text{-}RX}$ after the end of the last received downlink symbol in the same cell where $N_{RX\text{-}TX}$=25600Tc.

-continued

Note 3: For DAPS handover on a TDD band, a UE is not expected to receive in the downlink earlier than $N_{TX-RX}$ after the end of the last transmitted uplink symbol in the same cell where $N_{TX-RX}$=25600Tc.
Option 3: clarify that 10us switching time is allowed between source cell and target cell
Note 2: For DAPS handover on a TDD band, a UE is not expected to transmit in the uplink to source or target cell earlier than $N_{TX-RX}$ after the end of the last received downlink symbol from source or target cell in the same TDD band where $N_{RX-TX}$=19712Tc.
Note 3: For DAPS handover on a TDD band, a UE is not expected to receive in the downlink from source or target cell earlier than $N_{TX-RX}$ after the end of the last transmitted uplink symbol toward source or target cell in the same TDD band where $N_{TX-RX}$=19712Tc.
Other options
----------------------------end excerpt from 3GPP document-------------------------------

Fundamentally, there are two issues under discussion:

1) A typo, where the value 25600Tc was incorrectly captured as 26500 Tc.
2) Whether the N Rx-Tx and N Tx-Rx conditions would apply between uplink and downlink of the same cell (current wording in v16.5.0) or symbols from/towards source or target cell (proposed change).

To fit to the assumption that a UE may use shared radio components between source and target cell, then, from a UE perspective, the proposed change (in options 1 and 3) to make the condition on "source or target cell" makes sense. However, from a network perspective it is not possible, in general, to ensure that such a condition is not violated in some DAPS handovers with option 1. To show this, the timing of uplink and downlink for the source and target cell in a DAPS handover will be discussed below in more detail.

Firstly, the timing of transmission of the source and target cell may not be perfectly synchronized. In a TDD network, the relevant specification is (from 3GPP TS 38.133):

--------------------------begin specification excerpt------------------------------------------
7.4 Cell phase synchronization accuracy
7.4.1 Definition
Cell phase synchronization accuracy for TDD is defined as the maximum absolute deviation in frame start timing between any pair of cells on the same frequency that have overlapping coverage areas.
7.4.2 Minimum requirements
The cell phase synchronization accuracy measured at BS antenna connectors shall be better than 3 µs.
--------------------------end specification excerpt-----------------------------------------

In addition, the signals on both the uplink and downlink from/to both cells (source and target) and the UE are subject to propagation delays. The receive time difference (RTD) is the difference in slot start timing between the signal from the source cell and signal from the target cell at the UE antenna connector. The maximum RTD (denoted MRTD) is the maximum receive time difference, and for synchronous operation this needs to be within the limits shown in Table 1. If this value is exceeded, the operation is considered to be asynchronous, and only UEs that indicate asynchronous capability are required to be able to operate in such conditions.

In TDD, UE uplink timing of both source uplink and target uplink is controlled by the relevant gNB using timing advance (TA) commands. Initially, uplink timing is set as part of the random access procedure. Subsequently, it may be advanced or retarded using TA commands. During a DAPS handover, timing is controlled for each uplink. Similarly, the maximum transmit timing difference (MUD) that can be supported in synchronous operation is given in Table 1. Like the specified MRTD, this can only be exceeded in asynchronous operation.

SUMMARY

As seen above, the 3GPP specifications for NR purport to set limits on how quickly a UE is expected to be able to switch from receive operation to transmit operation and from transmit operation to receive operation, with those limits being expressed as $N_{RX-TX}$ and $N_{TX-RX}$, respectively. Expressed differently, the specification purports to guarantee that the UE will have at least that much time to switch. This guarantee works fine for uplink and downlink signals corresponding to the same cell. However, the promised receive-to-transmit time of $N_{RX-TX}$ cannot be fulfilled between downlink operation on the source cell and uplink operation on the target cell if UE positioned at or around cell edges unless the cell phase sync is ideal and zero. For example, if the reception of downlink in the source cell is 3 microseconds "late" with respect to the required uplink transmit timing, a switching time of $N_{RX-TX}$ is not sufficient unless guard period is over dimensioned and has margins. Similarly, the promised switching time of $N_{TX-RX}$ cannot be fulfilled between the source and target cells if the UE is positioned close to the cells, unless cell phase sync is ideal and zero.

The methods, apparatuses, and systems described herein address this problem in two ways: by detecting the problem, when it is likely to occur, and by appropriate mitigation, in response to such detecting.

An example method according to some of the techniques described below is performed by a device operating in a wireless network, where the device could be a UE or a network node, e.g., an NR gNB. This example method includes the step of determining whether a receive-to-transmit or transmit-to-receive switching limitation of a UE can be met during a dual-active protocol stack handover for the UE from a source cell to a target cell. The method further includes the step of taking one or more mitigation actions in response to said determining.

In some embodiments, the device carrying out this method is the UE. In some embodiments or instances, the UE may take one or more mitigation actions according to any of the following, e.g., in response to determining that a receive-to-transmit switching limitation of the UE cannot be met or is likely not to be met for a given downlink interval and immediately succeeding uplink interval: stopping early a downlink reception from the later of any scheduled receptions in the downlink interval from either or both of the source and target cells; skipping the later of any scheduled receptions in the downlink interval from either or both of the source and target cells; starting late, i.e., delaying the beginning of, the earliest of any scheduled transmission in the uplink interval to either or both of the source and target cells; and skipping the earliest of any scheduled transmission to either or both of the source and target cells in the uplink interval. Corresponding actions may apply when it is determined that an uplink-to-downlink switching limitation cannot be met or is likely not to be met.

In other embodiments, the device carrying out the method is a network node, and the taking one or more mitigation actions may include any one or more of any of: adjusting a scheduling of a downlink transmission to the UE; adjusting a scheduling of an uplink transmission from the UE; adjusting a timing advance for the UE to the source cell and/or the target cell; and determining whether to initiate the handover for the UE.

Further details for various approaches to detecting whether a switching limitation can be met and other variations of the above methods are detailed below, as are corresponding devices, systems, and computer program products. For example, user equipments (UEs) and network nodes adapted to carry out methods like those summarized above are described in detail, as are corresponding computer program products and computer-readable media.

The techniques described here enable the use of UE architectures without dual receiver and/or transmitter to maintain independent links with source and target cell are enabled. Data loss with such architectures, due to switching time, or, more specifically, being unable to meet switching time constraints at the UE, can be reduced or eliminated. Further, the TX-RX and RX-TX switching requirements at the UE do not need to be tightened, and neither does the synchronization between source and target cell in the network need to be improved beyond the current requirements.

DETAILED DESCRIPTION

Figure 1:
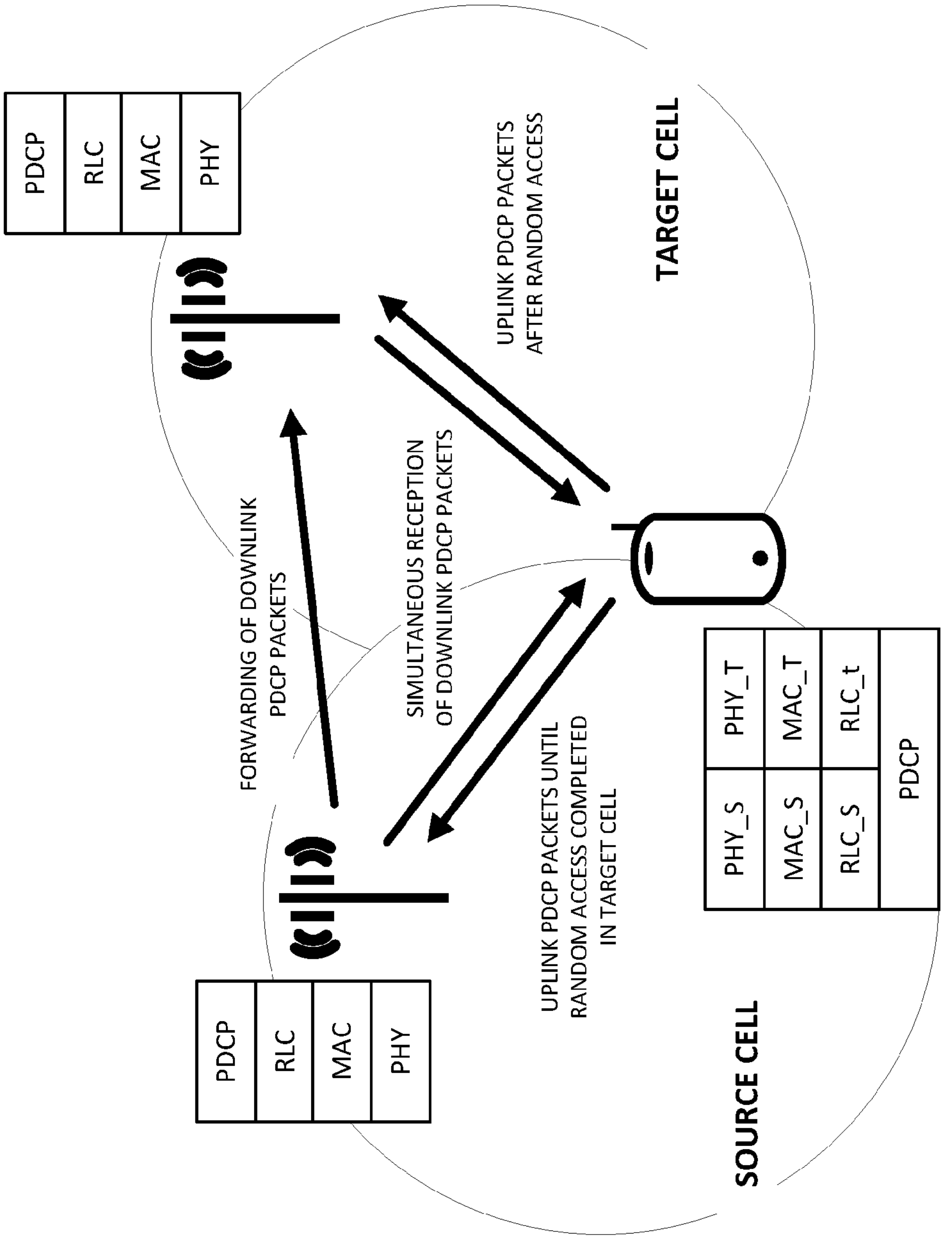
FIG. 1 illustrates dual-active protocol stack (DAPS) handover.

As discussed above, a problem with the current specifications for a dual-active protocol stack (DAPS) operation is that the switching times $N_{RX\text{-}TX}$ or $N_{TX\text{-}RX}$ allowed for same-cell operation are not suitable for transitions between two different cells, as might be encountered during a DAPS handover. There are two aspects to the solutions described herein: problem detection and problem mitigation. Note that while the solutions described herein are discussed in the context of DAPS handovers as standardized by 3GPP, these solutions may be applied more generally to any situation that resembles the dual-active protocol stack scenarios described herein.

First, scenarios are identified in which the problem will not occur from a UE perspective, even if the UE is at the cell edge. One example of such a scenario is that even though a UE is capable to transmit on both source and target uplink simultaneously, it will not always perform simultaneous transmission. Moreover, switching problems will only occur at certain geographical locations. The UE is also aware of uplink and downlink timing for both source and target links, so it would be aware of whether it is in a limiting scenario with $N_{RX\text{-}TX}$ or $N_{TX\text{-}RX}$, and one aspect of the techniques described herein is to exploit this information to trigger mitigation procedures only when necessary. Some UEs may also be capable of switching faster than the minimum requirements specified in 3GPP. Finally, it is pessimistic to assume that all network nodes have a cell phase sync error (difference in transmission time) of 3 microseconds, as this is the minimum requirement from the specification. In many cases, network nodes will be better synchronized, and the network may also have knowledge that the source cell and target cell are better aligned than 3 microseconds.

Another aspect of the techniques described herein is mitigation of the problem when it occurs. It is not expected that UEs could perform TX-RX or RX-TX switching with $N_{TX\text{-}RX}<25600Tc$ or $N_{RX\text{-}TX}<25600Tc$, so the UE, or network (both source and target cell) can take steps to reduce or eliminate the number of occasions on which a TX-RX or RX-TX transition occurs which does not meet these conditions. UE-based mitigation is based on partially, or completely, skipping an uplink transmission or downlink reception, either at slot or symbol level (so called autonomous interruption). Network-based mitigation may be based on not scheduling the UE, primarily avoiding UL grant on both links simultaneously, or tuning TA for a UE to provide additional switching time.

Before the target cell random access procedure, the UE only transmits to the source cell. After the UE performs a random access procedure towards the target cell, the UE transmits Packet Data Convergence Protocol (PDCP) data to the target cell. Consequently, there are many cases in which simultaneous UL transmission for both links is not necessary or can be avoided, thus reducing the problem.

At a high level, the solutions described herein comprise three main steps, of which one is optional:

1. Dynamic detection by either a UE or network node or both of a uplink-to-downlink (UL-to-DL) or downlink-to-uplink (DL-to-UL) switching limitation due to DAPS operation.
2. Optionally, reporting information from the UE to a network node to assist either the detection of a TX-RX or RX-TX switching limitation due to DAPS operation.
3. Mitigation procedures, which may be performed by either the UE or network or both to reduce or eliminate the occurrence of either TX-RX or RX-TX switching limitations due to DAPS operation in scenarios where the detection steps indicate that mitigation would be beneficial.

As can be seen from FIG. 1, a UE in DAPS handover is connected to both a source cell and a target cell. PDCP packets (i.e., user data) for the downlink are forwarded by the source cell to the target cell so that they can be transmitted to the UE by both nodes, although the corresponding transmissions in the physical layer could be scheduled at different times. This is primarily to allow the UE to receive the same user data from both source and target cell, which allows the interruptions associated with a hard switchover to be eliminated or reduced. For uplink PDCP packets, these are transmitted from the UE to the source cell until such time as the random access procedure to the target cell is completed, at which time the UL PDCP packets are transmitted to the target cell rather than the source cell (i.e., there is still a switchover of the user data on the uplink).

Even though the PDCP user data is switched to the uplink at completion of the random access procedure, there can still be further transmissions after the target random access procedure from the UE to the source cell, for such reasons as transmission of feedback on the Physical Uplink Control Channel (PUCCH), such as HARQ ACK/NACK of downlink packets, or because of CSI reporting, SRS transmission, or transmissions associated with signaling radio bearers such as the RRC connection for the source protocol stack.

Figure 2:
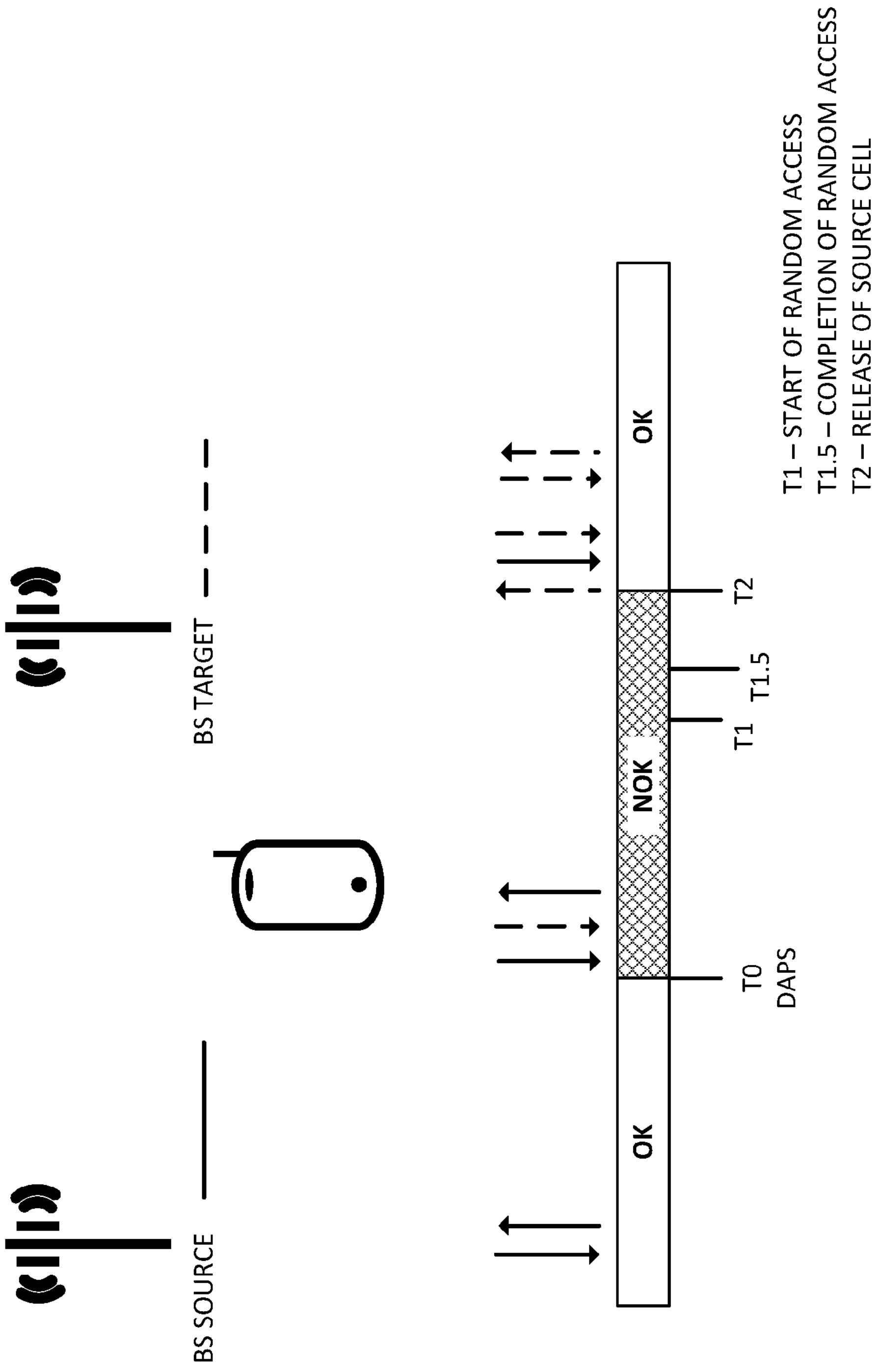
FIG. 2 illustrates the timing of operations for DAPS handover.

For the purposes of definition, refer to FIG. 2, which depicts mobility of the UE from the source to the target cell. Prior to time T0 as indicated in the figure, DAPS handover has not been started and the UE is connected to the source cell. At time T0, DAPS handover is indicated to the UE to be started and the UE begins to receive downlink from the target cell in addition to the source cell. After T0, at time T1, the UE begins to perform random access to the target cell on the uplink, completing the random access procedure by time T1.5. At time T1.5, the random access procedure to the target cell is completed, and, according to the procedures for DAPS handover, uplink PDCP data is subsequently transmitted only to the target cell. At time T2, the target gNB sends an RRC message to the UE to release the source cell. After this, the UE is only connected to the target cell.

Prior to T0 and after T2, the UE is not in DAPS handover and therefore does not have any DAPS related TX-RX or RX-TX switching issues, denoted by the green “OK” timeline. During the time TO to T1.5, the UE is in the initial phase of DAPS handover (receiving downlink from both source and target) and is transmitting PDCP and other data primarily to the source cell while performing necessary transmissions to the target cell associated with the random access procedure. During the time period T1.5 to T2, the UE has completed the uplink random access procedure and is primarily transmitting PDCP and other data to the target cell, while transmitting PUCCH, SRS and signaling information to the source cell as needed.

It may be observed that:

During time TO-T1, uplink transmissions take place primarily to the source cell.

During time T1-T2, uplink transmissions take place primarily to the target cell.

During Time Period T0 to T1

Figure 3:
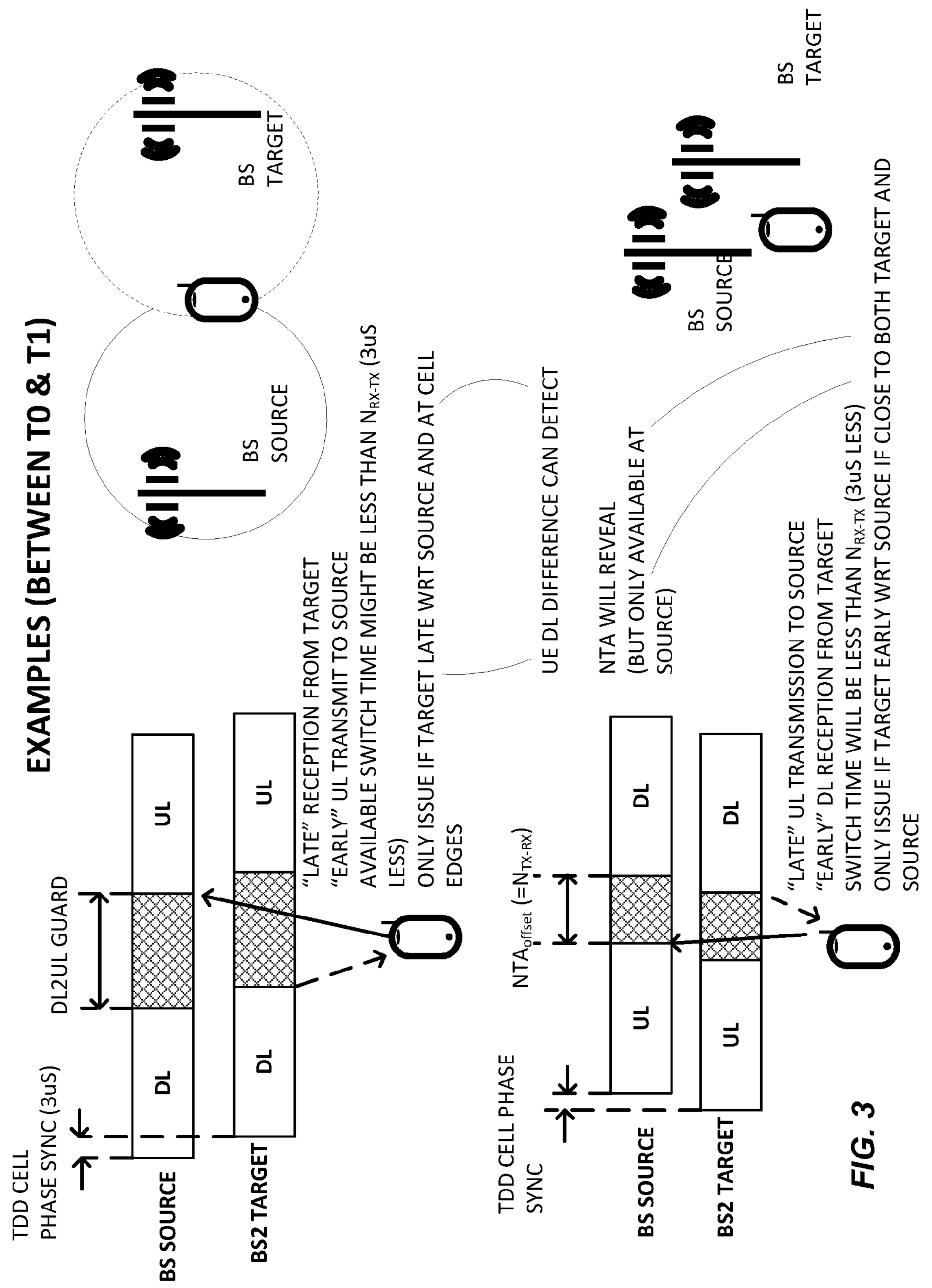
FIG. 3 illustrates details of timing issues for a first portion of a DAPS handover.

FIG. 3 shows an example case between T0 and T1, where there are assumed to be no uplink (UL) transmissions yet being performed to the target cell. Random access starts at time T1, at which time the UE will need to transmit PRACH preambles, HARQ feedback for RACH msg2 (RAR), RACH msg 3 (RRC connection request), HARQ feedback for RRC connection setup, and RRC connection setup complete according to the 4-stage RACH procedure, or the 2-stage RACH procedure introduced in release 16 may also be used. After the completion of this random access procedure at T1.5, UL PDCP data is sent to the target cell.

During time period T0 to T1, since there is no transmission to the target cell, there are reductions in available switching time in the following scenarios. Only after the start of the first PRACH preamble (after T1) will the UE start to transmit to target cell.

DL-to-UL switching, in case the target timing is later (up to 3 us later) than the source cell, as illustrated in the upper part of FIG. 3. If the UE is not scheduled on the target downlink (DL) (which it knows once the PDCCH at the start of the target DL slot has been received) or if there is no scheduled transmission to the source cell, then even this problem disappears.

UL-to-DL switching, in case the target timing is earlier (up to 3 us earlier) than the source cell, as illustrated in the lower part of FIG. 3. In this case, the UE may have to receive both downlinks since it will not be able to determine if it has been scheduled with a PDSCH transmission until it receives the PDCCH at the start of the slot. However, it can also be recognized that as user data (PDCP) is duplicated for both source and target cell, in many cases packets will be being discarded as duplicates in the higher layers of UE implementation anyway. Again, this will not be an issue unless there is an UL transmission triggered prior to the UL-to-DL switch.

During Time Period T1 to T2

Figure 4:
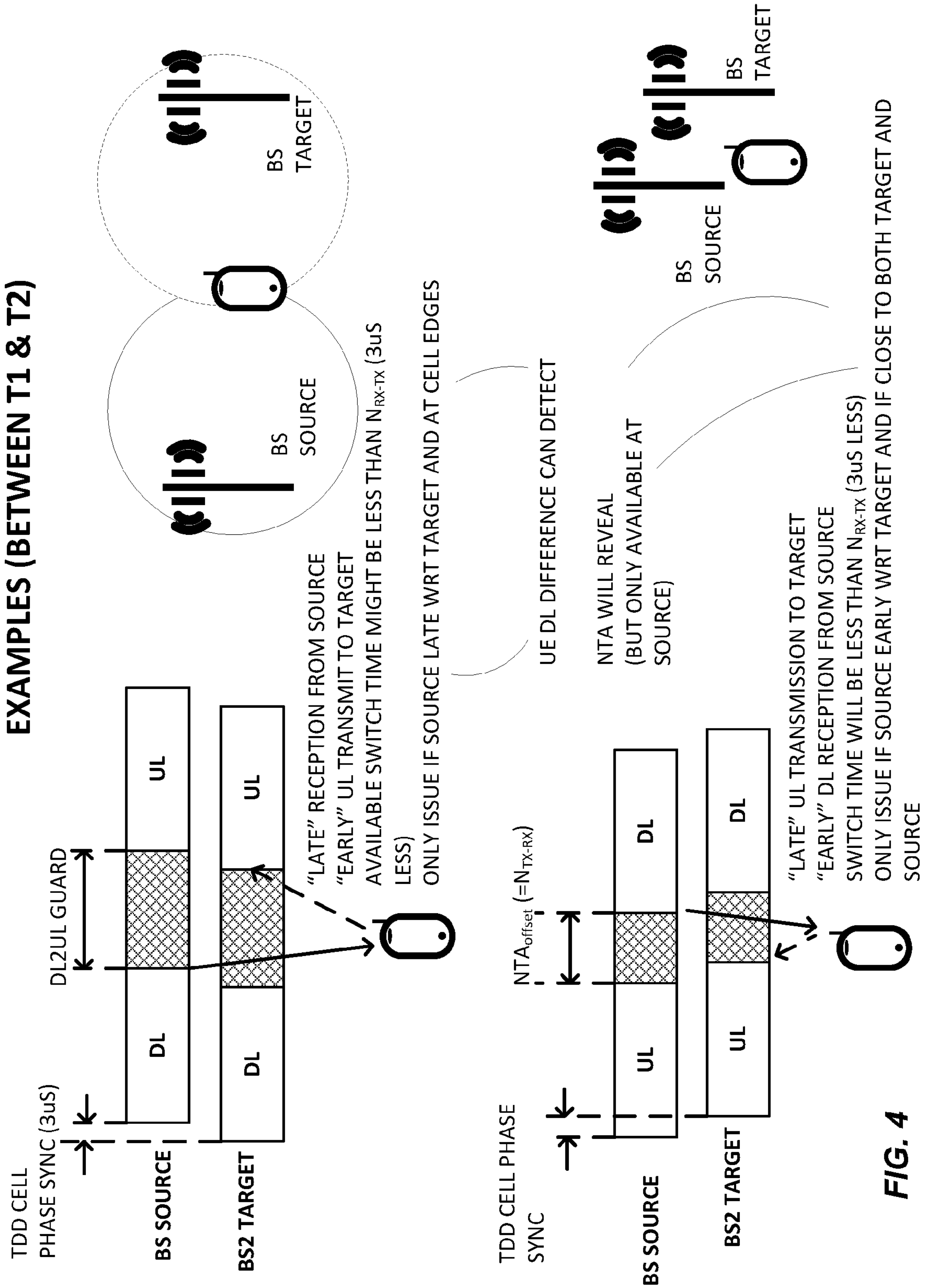
FIG. 4 illustrates details of timing issues for a second portion of a DAPS handover.

The situation during T1 to T2 is opposite to the situation during T0 to T1. UL data transmission is predominantly to the target cell (at least after T1.5), so the transmissions to the source cell are indicated in light red in FIG. 4. For RX-to-TX switching (upper FIG. 4) there will only be a problem if the source cell timing is later (up to 3 us later) than the target cell timing and the UE is scheduled to receive from the source cell.

Similarly, for TX-to-RX switching (lower FIG. 4), there is only a problem if the source timing is earlier than the target timing, when the UE need to switch in time to receive the downlink.

Note that timing offsets between source and target will not change substantially during short time periods (stable oscillators), so issues in, e.g., DL-to-UL switch can occur either before T1 or after T1, but not both. The same holds for UL-to-DL switching: there can be a problem between T0 and T1, or between T1 and T2, but not both.

We now turn our attention to the detailed procedure for problem detection at the UE. In principle, the UE tracks downlink timing of both source and target cell and is also configured to use a timing advance on both links (after random access response (RAR) on the target cell). In addition, it is aware of uplink grants from which it can schedule transmission, and it is aware of when it has been scheduled to receive PDSCH on either link downlink. It can also be expected that it is known at the UE, by design, how long the TX-RX or RX-TX switch will take. The guard period (GP) configuration and hence the available DL-to-UL guard time for both source and target cell is also known to the UE. So, in principle, the UE has all necessary information to determine, dynamically, whether there is insufficient time for any possible TX-RX or RX-TX switch. Techniques to determine whether there is a constraint are given in the following sections. Note that it would be difficult for the UE to be simultaneously constrained on DL-to-UL (as in the first section below) and UL-to-DL (as in the second section) switching with any reasonable configuration of guard period.

Method to Determine Whether there is a Constraint on DL-to-UL (RX-TX) Switching at the UE.

The following procedure may be followed to detect a constraint on DL-to-UL switching at the UE.

1. Determine the ending time of source DL reception, denoted as $T_{source,DL,end}$.
2. Determine the ending time of target DL reception, denoted as $T_{target,DL,end}$.
3. Determine an overall reception ending time according to:
   a. There is no constraint if the UE is not scheduled on either of the target PDSCH and source PDSCH, prior to DL2UL switching, or if there is no UL transmission after the switch and the procedure can be terminated with this determination.
   b. $T_{DL,end}=T_{source,DL,end}$ if there is no data scheduled on the target PDSCH.
   c. $T_{DL,end}=T_{target,DL,end}$ if there is no data scheduled on the source PDSCH.
   d. $T_{DL,end}=\max (T_{source,DL,end}, T_{target,DL,end}$ if there is data scheduled on both.
4. Determine a source transmission starting time according to $T_{source,ULstart}=T_{source,DL,end}+GP-N_{ta,offset}-N_{ta,source}$ ($N_{ta,offset}$ is defined in 3GPP TS 38.133 and $N_{ta,source}$ is the timing advance used for the source link. GP is the configured guard period.)
5. Determine a target transmission starting time according to $T_{target,ULstart}=T_{target,DL,end}+GP-N_{ta,offset}-N_{ta,target}$ ($N_{ta,offset}$ is defined in 3GPP TS 38.133 and $N_{tatarget}$ is the timing advance used for the target link, if configured by RAR, or 0 otherwise. GP is the configured guard period.)
6. Determine an overall transmission starting time according to
   a. Prior to random access start there is no UL transmission to target cell and therefore there can be no constraint arising from either source or target DL to target UL transmission. A constraint can only arise if there is UL transmission scheduled on the source cell.
   b. After random access start, there is no constraint if the UE is not scheduled to transmit to either of the source or target, i.e., no UL transmission directly after DL2UL switch, and the procedure can be terminated with this determination.
   C. $T_{UL,start}=T_{target,ULstart}$ if the UE is not scheduled to transmit to source.
   d. $T_{UL,start}=T_{source,ULstart}$ if the UE is not scheduled to transmit to target.
   e. $T_{UL,start}=\min (T_{target,ULstart}, T_{source,ULstart})$ if there is transmission scheduled on both.
7. IF $T_{UL,start}-T_{target,DL,end}<$UE switching capability the UE is constrained on DL to UL switching. UE switching capability may be 25600 Tc or some shorter value if the UE has enhanced capability compared to 3GPP minimum requirements.

Method to Determine Whether there is a Constraint on UL-to-DL (TX-RX) Switching at the UE.

The following procedure may be followed to detect a constraint on DL-to-UL switching at the UE.

1. Determine the starting time of source DL reception, denoted as $T_{source,DL,start}$
2. Determine the starting time of target DL reception, denoted as $T_{target,DL,start}$.
3. Determine a reception starting time according to $T_{DL,start}=\min (T_{source,DL,start}, T_{target,DL,start})$.
4. Determine the ending time of source uplink transmission according to $T_{source,ULend}=T_{source,DL,start}-N_{ta,source}-N_{ta,offset}$.
5. Determine the ending time of target uplink transmission according to $T_{target,ULend}=T_{target,DL,start}-N_{ta,target}-N_{ta,offset}$.
6. Determine a transmit ending time according to:
   a. Prior to random access start there is no UL transmission to target cell, and therefore there can be no constraint arising from either source or target DL to target UL transmission. A constraint can only arise if there is UL transmission scheduled on the source cell.
   b. After random access start, there is no constraint if the UE is not scheduled to transmit to either the source or target, and the procedure can be terminated with this determination.
   c. $T_{UL,end}=T_{target,ULend}$ if the UE is not scheduled to transmit to source.
   d. $T_{UL,end}=T_{source,ULend}$ if the UE is not scheduled to transmit to target.
   e. $T_{UL,end}=\max(T_{target,ULend},T_{source,ULend})$ if the UE is scheduled to transmit to both.
7. IF $T_{DL,start}-T_{UL,end}=<$UE switching capability the UE is constrained on UL to DL switching. UE switching capability may be 25600 Tc or some shorter value if the UE has enhanced capability compared to 3GPP minimum requirements.

Switching Time Problem Detection at gNB/eNB

Detection at a network node is like the procedure at the UE with the following differences:

1. The exact difference in downlink timing at the UE is unknown to the network, since the network does not know exact propagation delay from either source or target cell to the UE, nor does it know the exact transmission time difference between the source and target cell (if such information were known, it could be used to perfectly synchronise the source and target node). One method to address this is to use SFTD (SFN and frame timing difference measurement). To facilitate this for intra-frequency DAPS handover, 3GPP specifications may need extension to define requirements for intra-frequency SFTD measurement.
2. The exact Nta for the source cell is not known to the network. It may be estimated from the initial Nta set by the source cell random access response, and an accumulation of all TA commands sent to the UE after the initial random access. This estimate may not be fully accurate, as some TA commands may have been transmitted by the source cell, but not successfully received by the UE.

Figure 5:
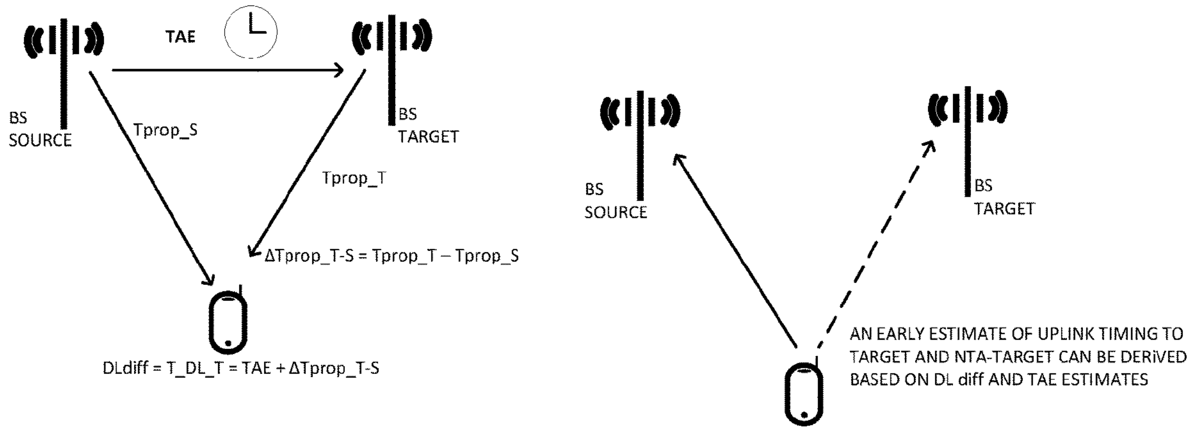
FIG. 5 illustrates relationships between uplink and downlink timings for source and target cells.

3. Prior to start of random access, the exact Nta for the target does not need to be known, as there is no target uplink transmission. The exact Nta for the target cell becomes known to the network when a PRACH preamble is detected and an initial Nta is set in the random access response. After this, the Nta for the target cell may be tracked similarly as the Nta for the source cell, i.e., by accumulating transmitted TA commands with similar caveat that some TA commands may be transmitted by the network node but not successfully received by the UE.
4. Reporting of Nta for source and target cell from the UE to the network could be introduced in future.
5. Based on time difference (SFTD) between the cells, BS TAE estimates, or direct estimates of Nta for source and target cell, the techniques described in the two preceding sections may be carried out in the gNB or eNB rather than, or as well as, in the UE. FIG. 5 illustrates the relationships between TAE estimates, downlink DL timing estimates, and target and source cell timings.

Reporting of any or all of the following quantities could be beneficial to allow the network to determine if the UE is potentially facing a switching constraint:

1. In existing 3GPP specifications, SFTD measurement is defined but with limited applicability (see 3GPP TS38.215) to certain dual-connectivity scenarios. In particular, this measurement is applicable for RRC_CONNECTED intra-frequency for EN-DC, NE-DC, and NR-DC operation, and for RRC_CONNECTED inter-frequency operation for UEs with NR PCell but no E-UTRA/NR PSCell.
   The measurement does not support intra-frequency SFTD between two cells on the same frequency for standalone NR, which would be beneficial for network to get visibility of time difference between source and target cell in an intra-frequency DAPS handover.
2. $N_{TA}$, calculated on both source and target links (target link after RAR) would be beneficial to give a more exact knowledge of the uplink. As indicated in the preceding section, the network (NW) can already accumulate TA commands to estimate UE TA, however some TA commands may be lost due to failed reception, so an indication of Nta from the UE is more accurate than an estimate based on accumulation.
3. Alternatively, or in addition, if evaluation of switching constraints is performed by the UE according to the methods described above, the UE may directly indicate by signaling whether it is constrained by UL to DL switching or DL to UL switching. Such an indication can be made, for example, with L1 signalling (such as UCI, uplink control information), MAC signaling or RRC signaling. Such signaling may be fully dynamic (i.e., provide an indication on a frame-by-frame basis if the UE has a constraint) or may provide an average indication. Methods for providing an average indication include counting the number of frames where the UE has had an UL to DL or DL to UL constraint over a time window and comparing with a threshold, or calculating a rate (ratio of constrained frames to total frames) over a time window. The time window may be configurable or may be fixed by specifications or may be left to UE implementation. The result of such an average evaluation/may be reported to the network. The constraint at the UE may change before random access and after random access, so the signaling may allow for the UE to make a further updated indication at this point in time. The design of such signaling may also take into account mobility in the UE (i.e., changes in propagation delay), the possible drift of cell phase sync (which can be assumed to be small and negligible during the time duration of a DAPS handover) and the likely time durations of the DAPS procedures. For example, single shot signaling may be appropriate, or it may be necessary for the UE to have a procedure whereby it can update indications that it has become, or stopped being, constrained.

Autonomous Mitigation at the UE

To autonomously mitigate a constraint, the UE needs to make more time available for switching than would be available if all the specified signals were transmitted to and received from the source and target cells with the specified timing. This can be achieved in the following ways:

- In the case of a UL to DL constraint, by either:
  - Stopping the uplink transmission to the later of the two cells (source or target) early or skipping uplink transmission to the later of the two cells.
  - Starting the downlink reception to the earlier of the two cells (source or target) late or skipping downlink reception from the earlier of the two cells.
- In the case of a DL to UL constraint, by either
  - Stopping the downlink reception from the later of the two cells (source or target) early or skipping reception from the later of the two cells.
  - Starting the uplink transmission to the earlier of the two cells (source or target) late or skipping uplink transmission to the earlier of the two cells. Starting the uplink transmission late means delaying the beginning of the uplink transmission, relative to the scheduled start time.

Such mitigation procedures can be regarded as a prioritization step, i.e., the UE will actively avoid a certain transmission or reception if it creates a TX-to-RX or RX-to-TX switching problem.

To determine prioritization, the following principles of PDCP routing (from DAPS handover background) can be considered.

Downlink PDCP is forwarded from source to target throughout the DAPS procedure (from T0 to T2). If the UE successfully receives all PDCP packets from both source and target cell, it will at any rate discard duplicated PDCP packets, so in this case it does not matter from a user throughput perspective if PDCP packets from one or other cell are not received. In practice, there are possible other downlink transmissions than PDCP packets, such as downlink control information, RRC radio bearers, and so on, but nevertheless it can be considered that downlink losses are less critical during the time T0 to T2 than when the UE is connected to only one cell (i.e., before T0 or after T2). Since the UE is generally expected to be moving from the source cell to the target cell, it can be assumed that at the beginning of the DAPS handover, downlink from the source cell may be more reliable from a radio perspective and at the end of the DAPS handover, downlink from the target cell may be more reliable from a radio perspective. Hence some possible example prioritizations of DL reception would be:

- Alt-1: Prioritize reception from the source cell prior to the start of the random access procedure and reception from the target cell after the start of the random access procedure.

Alt-2: Prioritize reception from the source cell prior to the start of the random access procedure and reception from the target cell after the completion of the random access procedure.

Alt-3: Prioritize reception from the source cell and reception from the target cell dynamically according to an assessment of radio quality of the source and target cell. Assessment of radio quality can be done by different means in UE implementation, including examples such as measurement of signals including SSB signals, CSI-RS signals (which includes tracking reference signals), measurements based on DMRS, or measurements of an error rate based on PDCCH or PDSCH decoding.

Uplink PDCP is switched when the random access procedure is completed to the target cell. So, it can be understood that UL transmissions to the source cell are a high priority before T1.5 and UL transmissions to the target cell are a higher priority after T1.5. One exception to this may be the random access procedure itself, starting at time T1, which also takes a finite time. If the random access procedure towards the target fails then the DAPS handover itself will fail, and it is then specified that the UE falls back to the source cell. So, it could be considered that the random access procedure to the target is an even higher priority than the PDCP transmission, which will be towards the source cell until the RA procedure is completed. Hence, the overall preferred prioritization for UL is:

Recognize that there can only be UL transmissions towards the source cell until the beginning of the random access procedure towards the target cell and then prioritize UL transmissions towards the target cell.

Although it would also be justifiable to consider that PDCP is more important than the RA procedure (which also has some robustness in case of failures), leading to an alternative UL prioritization as:

Prioritize transmissions towards the source cell until the completion of the random access procedure towards the target cell, then prioritize UL transmissions towards the target cell.

The prioritization can be used along with the basic possible mitigation strategies listed at the start of this section to give the following overall techniques:

In the case of a UL to DL constraint, by:

Determining whether source DL reception or target DL reception is higher priority.

Determining whether source UL transmission or target UL transmission (if applicable) is higher priority.

Determining which of the source and target cells has earlier timing.

Determining valid mitigation strategy according to some rules based on the determined priorities and timing. Example rules are:

1. If the target cell has earlier timing and the source UL transmission has lower priority than the target UL transmission then use “prioritize target UL transmission” as a mitigation strategy.
2. If the source cell has earlier timing and the target UL transmission has lower priority than the source UL transmission then use “prioritize source UL transmission” as a mitigation strategy.
3. If the target cell has earlier timing and the target DL reception has lower priority than the source DL then use “prioritize source DL reception” as mitigation strategy.
4. If the source cell has earlier timing and the source DL reception has lower priority than the target DL then use “prioritize target DL reception” as mitigation strategy.

In the case of a DL to UL constraint, by

Determining whether source DL reception or target DL reception is higher priority.

Determining whether source UL transmission or target UL transmission (if applicable) is higher priority.

Determining which of the source and target cells has earlier timing.

Determining valid mitigation strategy according to some rules based on the determined priorities and timing. Example rules are:

1. If the target cell has earlier timing and the target UL transmission has lower priority than the source UL transmission, then use “prioritize source UL transmission” as a mitigation strategy.
2. If the source cell has earlier timing and the source UL transmission has lower priority than the target UL transmission, then use “prioritize target UL transmission” as a mitigation strategy.
3. If the target cell has earlier timing and the source DL reception has lower priority than the target DL, then use “prioritize target DL reception” as mitigation strategy.
4. If the source cell has earlier timing and the target DL reception has lower priority than the source DL, then use “prioritize source DL reception” as mitigation strategy.

In some cases, the example mitigation strategy selection may result in multiple valid mitigation strategies. In these cases, there will be a valid DL based strategy and also a valid UL based strategy. In this case, a further rule can be used to resolve the finally selected strategies from the valid options. Two examples of further such rules are:

Select downlink-based mitigation in the event both downlink- and uplink-based mitigation are possible.

Select uplink-based mitigation in the event both downlink- and uplink-based mitigation are possible.

Mitigation at the Network Node

Several possible mitigation methods can be envisaged for a network node. Three different mitigation options are considered:

Alt 1: Use the legacy (i.e., non-DAPS) handover procedure if it is determined that a UL-DL or DL-UL switching constraint may occur during the DAPS handover.

Alt 2: Scheduling-based mitigation.

Alt 3: Nta adjustment-based mitigation.

These alternatives do not need to be mutually exclusive. Alt 1 is self-explanatory, although the decision to use a non-DAPS handover needs to be made prior to time T0 and at this time the UE will not have communicated with the target cell, and hence a method is beneficial to determine a likely Nta for the target link if such communication would be established.

For Alt 2, the option is to schedule the UE for either UL transmission or DL reception on only one of the cells (source or target), around the switching occasion, if this will address a switching issue. The basic methodology for doing this is as follows:

Source timing is earlier than target timing and the UE is constrained by UL to DL switching: only schedule uplink on the source cell or only schedule downlink on the target cell. Note that in this case, the UE still needs to attempt to receive and decode PDCCH from both cells to determine if it is scheduled. However, not scheduling the UE is still advantageous because if the UE fails to receive the PDCCH symbols due to insufficient switching time, nothing is lost in the case the lost symbols will correspond to a PDCCH on which the UE has not been scheduled at any rate.

- Target timing is earlier than source timing and the UE is constrained by UL to DL switching: only schedule uplink on the target cell or only schedule downlink on the source cell. Note that in this case, the UE still needs to attempt to receive and decode PDCCH from both cells to determine if it is scheduled. PDCCH is transmitted in the first symbol(s) of the slot. However, not scheduling the UE is still advantageous because if the UE fails to receive the PDCCH symbols due to insufficient switching time, nothing is lost in the case the lost symbols will correspond to a PDCCH on which the UE has not been scheduled at any rate.
- Source timing is earlier than target timing and the UE is constrained by DL to UL switching: only schedule uplink on the target cell or only schedule downlink on the source cell.
- Target timing is earlier than source timing and the UE is constrained by DL to UL switching: only schedule uplink on the source cell or only schedule downlink on the target cell.

As there exist multiple possible mitigation strategies, the same prioritization scheme as described in the previous section could be applied in the network, namely the network can determine whether to use an uplink-based mitigation strategy according to either:

- prioritizing uplink transmissions to the target cell from the start of the random access procedure, or
- prioritizing uplink transmissions to the target cell from the end of the random access procedure.

If this does not result in a valid mitigation strategy, then a downlink mitigation strategy is used.

An alternative or additional mitigation approach in the network is to adjust the Nta timing of either source or target cell or both.

For Alt 3, mitigation is based on tuning or adjusting Nta for either source or target link, compared with the Nta setting that would nominally be used if switching constraints do not need to be considered. Since Nta is a timing advance value, UE transmissions can be advanced (made earlier in time) by increasing Nta compared with the nominal setting, or retarded (made later in time) by reducing Nta compared with the nominal setting. Nta cannot be negative and there is also a maximum Nta supported by UE but within these limitations, UE uplink timing can be tuned to remove a switching constraint for either DL-UL or UL-DL. There are also further limitations from network implementation perspective such as the need to keep all received signals from UEs starting within a cyclic prefix window (CP) at the gNB/eNB receiver to maintain orthogonality between UE uplink transmissions and avoid excessive interference but nevertheless the gNB/eNB has some flexibility to adjust the timing of an individual UE without significant harm to the reception of signals from other UEs Estimating Likely Target Nta Prior to Target Cell Random Access Procedure In several embodiments and mitigation strategies it is useful to predict or estimate likely target Nta. The timing for the target transmission will be established as part of the random access procedure when the UE initially communicates with the target cell. However, it is useful to estimate a likely value before the random access procedure has been performed. This can be used to determine if the addition of the target cell uplink is likely to cause a new switching constraint which does not exist prior to the starting of the target cell. This would be useful, for example to decide to perform legacy handover rather than DAPS handover. One source of such information is statistics collected by network for previous handovers made by other UEs, where Nta values could be stored. UEs may also collect and store information on conditions during a handover which would allow them to predict conditions in a similar handover occurring in the future.

The network or UE may also make an estimate of Nta to the target cell prior to random access towards the target cell using an estimate of cell phase synchronization and relative timing difference between source and target cell.

Figure 6:
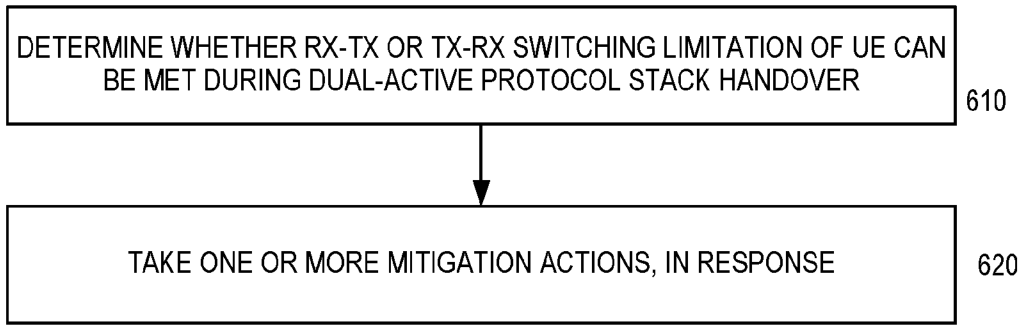
FIG. 6 is a process flow diagram illustrating an example method according to some embodiments.

In view of the detailed examples and explanation provided above, it will be appreciated that FIG. 6 is a process flow diagram illustrating a generalized method, performed by a device in a wireless network, for mitigating the problems described above. Various embodiments of this method may be performed by UEs and network nodes such as gNBs and eNBs.

As shown at block 620, the illustrated method begins with determining whether a receive-to-transmit or transmit-to-receive switching limitation of a user equipment, UE, can be met during a dual-active protocol stack, handover for the UE from a source cell to a target cell. As shown at block 620, the method continues with the step of taking one or more mitigation actions in response to said determining.

The device carrying out the method may be a UE. In some embodiments or instances, the UE may take one or more mitigation actions according to any of the following, e.g., in response to determining that a downlink-to-uplink switching limitation (i.e., receive-transmit switching limitation) of the UE cannot or is likely not to be met, for a given downlink interval and immediately succeeding uplink interval: stopping early a downlink reception from the later of any scheduled receptions in the downlink interval from either or both of the source and target cells; skipping the later of any scheduled receptions in the downlink interval from either or both of the source and target cells; starting late, i.e., delaying the beginning of, the earliest of any scheduled transmission in the uplink interval to either or both of the source and target cells; and skipping the earliest of any scheduled transmission to either or both of the source and target cells in the uplink interval. In some embodiments or instances, taking the one or more mitigation actions may be further responsive to evaluating priorities of one or more scheduled uplink transmissions by the UE and/or one or more scheduled downlink transmissions to the UE.

In some embodiments, the UE may determine, for a given downlink interval and immediately succeeding uplink interval, that there is a constraint on receive-to-transmit switching by: determining the latest ending time for scheduled reception by the UE in the downlink interval of transmissions from either or both of the source cell and target cell for the DAPS handover; determining the earliest starting time for scheduled transmission by the UE in the uplink interval to either or both of the source cell and target cell for the DAPS handover; and determining that the difference between said latest ending time and said earliest starting time is less than a predetermined minimum downlink-to-uplink switching time for the UE. In some of these embodiments, determining the earliest starting time may take into account a timing advance corresponding to each of the source cell and the target cell and a configured guard period for downlink-to-uplink switching. A timing advance offset may also be taken into account.

In some embodiments or instances, the UE may determine that an uplink-to-downlink switching limitation (i.e., transmit-to-receive switching limitation) of the UE cannot or is likely not to be met and take one or more mitigation actions according to any of: stopping early the later of any scheduled transmission in the uplink interval to either or both of the source and target cells; skipping the later of any scheduled transmission in the uplink interval to either or both of the source and target cells; starting late the earliest of any scheduled receptions in the downlink interval from either or both of the source and target cells; and skipping the earliest of any scheduled receptions in the downlink interval from either or both of the source and target cells. Again, in some embodiments or instances, taking the one or more mitigation actions may be further responsive to evaluating priorities of one or more scheduled uplink transmissions by the UE and/or one or more scheduled downlink transmissions to the UE.

In some embodiments, the UE may determine, for a given uplink interval and immediately succeeding downlink interval, that there is a constraint on transmit-to-receive switching by: determining the earliest starting time for scheduled reception by the UE in the downlink interval of transmissions from either or both of the source cell and target cell for the DAPS handover; determining the latest ending time for scheduled transmission by the UE in the uplink interval to either or both of the source cell and target cell for the DAPS handover; and determining that the difference between said earliest starting time and said latest ending time is less than a predetermined minimum uplink-to-downlink switching time for the UE. In some of these embodiments, for example, determining the latest ending time may take into account a timing advance corresponding to each of the source cell and the target cell. A timing advance offset may also be taken into account.

In some embodiments carried out by a UE, taking one or more mitigation actions may comprise sending, to the wireless network, an indication that a receive-to-transmit or transmit-to-receive switching limitation of the UE cannot or is likely not to be met during a DAPS handover for the UE from the source cell to the target cell. This may enable the network to take additional mitigating actions.

In some embodiments, the method illustrated in FIG. 6 may be carried out by a network node. In such an embodiment, the network may, in some embodiments or instance, determine, for a given downlink interval and immediately succeeding uplink interval, that there is a constraint on receive-to-transmit switching by the UE by: estimating the latest ending time for scheduled reception by the UE in the downlink interval of transmissions from either or both of the source cell and target cell for the DAPS handover; estimating the earliest starting time for scheduled transmission by the UE in the uplink interval to either or both of the source cell and target cell for the DAPS handover; and determining that the difference between said latest ending time and said earliest starting time is less than a predetermined minimum downlink-to-uplink switching time for the UE.

Estimating the earliest starting time may take into account an estimated timing advance for each of the source cell and the target cell. In some of these latter embodiments, the network node may estimate the timing advance for the source cell based on an accumulation of timing advance commands sent to the UE by the source cell.

In some embodiments, estimating the earliest starting time may take into account a timing advance reported by the UE for either or each of the source cell and the target cell, and/or a receive timing difference (RTD) reported by the UE, and/or a base station timing alignment error (TAE) corresponding to the source and target cells.

In some embodiments or instances, the network node may determine, for a given uplink interval and immediately succeeding downlink interval, that there is a constraint on transmit-to-receive switching by the UE by: estimating the earliest starting time for scheduled reception by the UE in the downlink interval of transmissions from either or both of the source cell and target cell for the DAPS handover; estimating the latest ending time for scheduled transmission by the UE in the uplink interval to either or both of the source cell and target cell for the DAPS handover; and determining that the difference between said earliest starting time and said latest ending time is less than a predetermined minimum uplink-to-downlink switching time for the UE.

In some of these embodiments, estimating the latest ending time may take into account an estimated timing advance for each of the source cell and the target cell. In some of these embodiments, the estimating may estimate the timing advance for the source cell based on an accumulation of timing advance commands sent to the UE by the source cell.

In some embodiments, estimating the latest starting time may take into account a timing advance reported by the UE for either or each of the source cell and the target cell, and/or a receive timing difference (RTD) reported by the UE, and/or a base station timing alignment error (TAE) corresponding to the source and target cells.

In some embodiments where the method of FIG. 6 is carried out by a network node, taking one or more mitigation actions may comprise any one or more of: adjusting a scheduling of a downlink transmission to the UE; adjusting a scheduling of an uplink transmission from the UE; and adjusting a timing advance for the UE to the source cell and/or the target cell. In some embodiments or instances, taking the one or more mitigation actions may be further responsive to evaluating priorities of one or more scheduled uplink transmissions by the UE and/or one or more scheduled downlink transmissions to the UE.

In other embodiments or instances where the method of FIG. 6 is carried out by a network node, taking one or more mitigation actions may comprise determining not to initiate a DAPS handover for the UE.

In some embodiments the network node may receive, from the UE, an indication of whether a receive-to-transmit or transmit-to-receive switching limitation of the UE can be met during a dual-active protocol stack handover for the UE from the source cell to the target cell. In these embodiments, the determining shown in FIG. 6 may be based on said indication.

Figure 7:
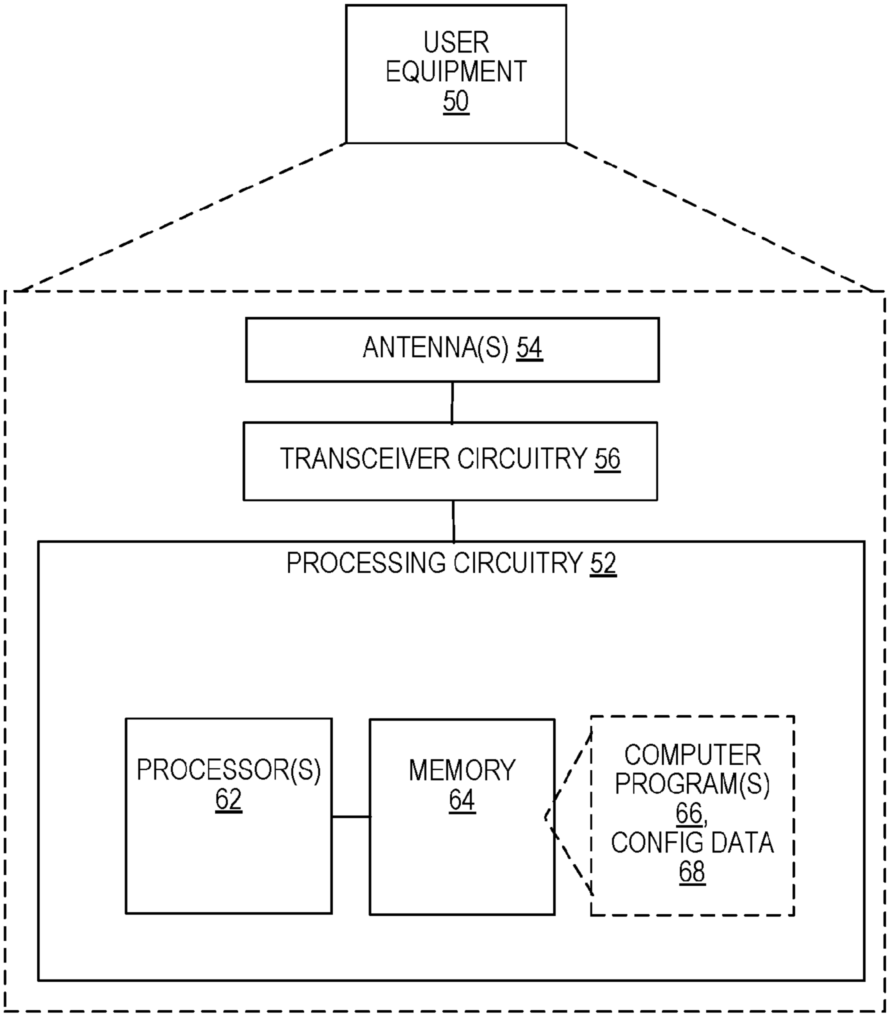
FIG. 7 is a block diagram illustrating an example UE.

FIG. 7 illustrates a diagram of a user equipment 50 configured to operate in a wireless network according to any of the techniques described above, according to some embodiments. User equipment 50 may be considered to represent any wireless devices or terminals that may operate in a network, such as a UE in a cellular network. Other examples may include a communication device, target device, MTC device, IoT device, device to device (D2D) UE, machine type UE or UE capable of machine-to-machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

User equipment 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. The radio access technology can be NR or LTE, for the purposes of this discussion.

User equipment 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the UE functionality described herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed herein.

Processing circuitry 52 of the user equipment 50 is configured, according to some embodiments, to perform any or all of the techniques described herein for a user equipment.

Figure 8:
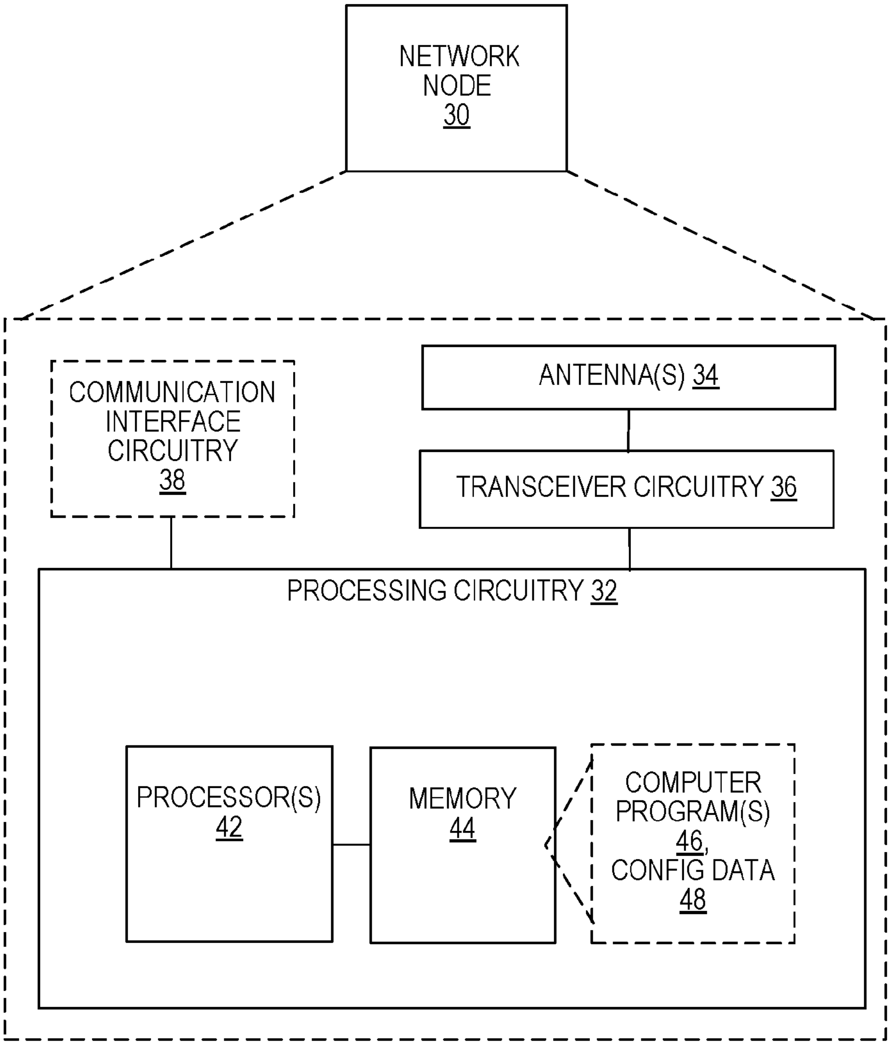
FIG. 8 is a block diagram illustrating an example network node.

FIG. 8 shows an example network node 30 that may correspond to any of the access nodes or other network nodes described herein. Network node 30 may be configured to carry out one or more of the presently disclosed techniques. Network node 30 may be an evolved Node B (eNodeB), Node B or gNB, for example. Network node may represent a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS).

In the discussion herein, network node 30 is described as being configured to operate as a cellular network access node in an LTE network or NR network, but network node 30 may also correspond to similar access nodes in other types of network.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof.

Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the network node 30 is configured, according to some embodiments, to perform the techniques described herein for a network node, as described in the several example techniques described above.

Figure 9:
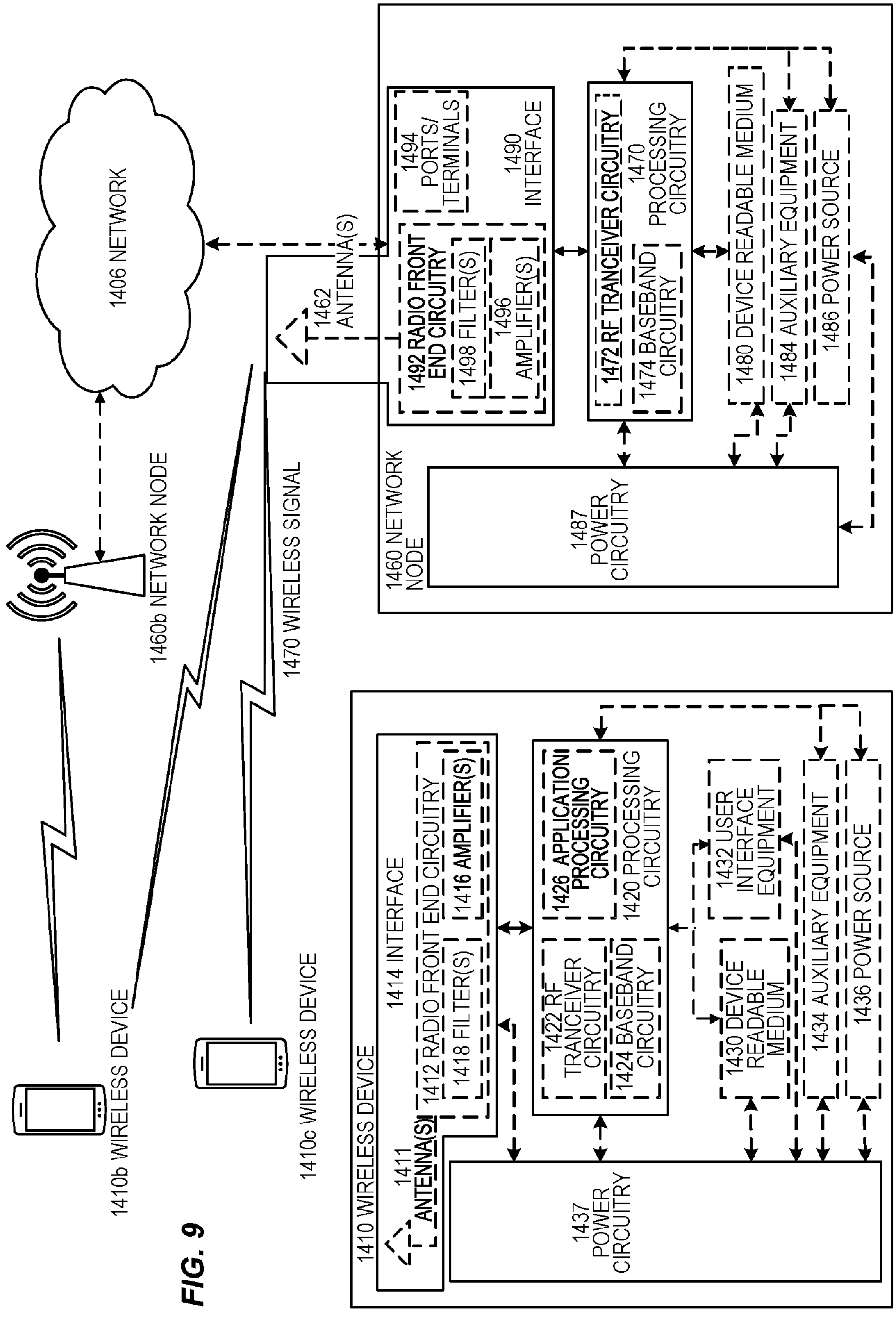
FIG. 9 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 1406, network nodes 1460 and 1460*b*, and wireless devices 1410, 1410*b*, and 1410*c*. In practice, a wireless network can further include any additional elements suitable to support communication between wireless devices or between a wireless device and another communication device, such as a landline telephone, a service provider, or any other network node or end device. Of the illustrated components, network node 1460 and wireless device 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and wireless device 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 9, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions, and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeBs. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination. Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units.

In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460 but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signaling and/or data between network node 1460, network 1406, and/or wireless devices 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or wireless devices via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line-of-sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 9 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

In some embodiments, a wireless device (e.g., wireless device 1410) can be configured to communicate wirelessly with network nodes (e.g., 1460) and/or other wireless devices (e.g., 1410*b, c*). Communicating wirelessly can involve transmitting and/or receiving wireless signals using electromagnetic waves, radio waves, infrared waves, and/or other types of signals suitable for conveying information through air. In some embodiments, a wireless device can be configured to transmit and/or receive information without direct human interaction. For instance, a wireless device can be designed to transmit information to a network on a predetermined schedule, when triggered by an internal or external event, or in response to requests from the network.

Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

A wireless device can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a wireless device can represent a machine or other device that performs monitoring and/or measurements and transmits the results of such monitoring and/or measurements to another wireless device and/or a network node. The wireless device can in this case be a machine-to-machine (M2M) device, which can in a 3GPP context be referred to as an MTC device. As one particular example, the wireless device can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a wireless device can represent a vehicle or other equipment that is capable of monitoring and/or reporting on its operational status or other functions associated with its operation. A wireless device as described above can represent the endpoint of a wireless connection, in which case the device can be referred to as a wireless terminal.

Furthermore, a wireless device as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. Wireless device 1410 can include multiple sets of one or more of the illustrated components for different wireless technologies supported by wireless device 1410, such as, for example, GSM, WCDMA, LTE, NR, WiFi, WiMAX, or Bluetooth wireless technologies, just to mention a few. These wireless technologies can be integrated into the same or different chips or set of chips as other components within wireless device 1410.

Antenna 1411 can include one or more antennas or antenna arrays, configured to send and/or receive wireless signals, and is connected to interface 1414. In certain alternative embodiments, antenna 1411 can be separate from wireless device 1410 and be connectable to wireless device 1410 through an interface or port. Antenna 1411, interface 1414, and/or processing circuitry 1420 can be configured to perform any receiving or transmitting operations described herein as being performed by a wireless device. Any information, data and/or signals can be received from a network node and/or another wireless device. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420 and can be configured to condition signals communicated between antenna 1411 and processing circuitry 1420. Radio front end circuitry 1412 can be coupled to or a part of antenna 1411. In some embodiments, wireless device 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or wireless devices via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 1410 components, such as device readable medium 1430, wireless device 1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of wireless device 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a wireless device can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of wireless device 1410, but are enjoyed by wireless device 1410 as a whole, and/or by end users and the wireless network generally.

Processing circuitry 1420 can be configured to perform any determining, calculating, or similar operations (e.g., certain obtaining operations) described herein as being performed by a wireless device. These operations, as performed by processing circuitry 1420, can include processing information obtained by processing circuitry 1420 by, for example, converting the obtained information into other information, comparing the obtained information or converted information to information stored by wireless device 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with wireless device 1410. Such interaction can be of many forms, such as visual, audial, tactile, etc. User interface equipment 1432 can be operable to produce output to the user and to allow and/or facilitate the user to provide input to wireless device 1410. The type of interaction can vary depending on the type of user interface equipment 1432 installed in wireless device 1410. For example, if wireless device 1410 is a smart phone, the interaction can be via a touch screen; if wireless device 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into wireless device 1410 and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from wireless device 1410, and to allow and/or facilitate processing circuitry 1420 to output information from wireless device 1410. User interface equipment 1432 can include, for example, a speaker, a display, vibrating circuitry, a USB port, a headphone interface, or other output circuitry. Using one or more input and output interfaces, devices, and circuits, of user interface equipment 1432, wireless device 1410 can communicate with end users and/or the wireless network, and allow and/or facilitate them to benefit from the functionality described herein.

Auxiliary equipment 1434 is operable to provide more specific functionality which may not be generally performed by wireless devices. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. Wireless device 1410 can further comprise power circuitry 1437 for delivering power from power source 1436 to the various parts of wireless device 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case wireless device 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of wireless device 1410.

Figure 10:
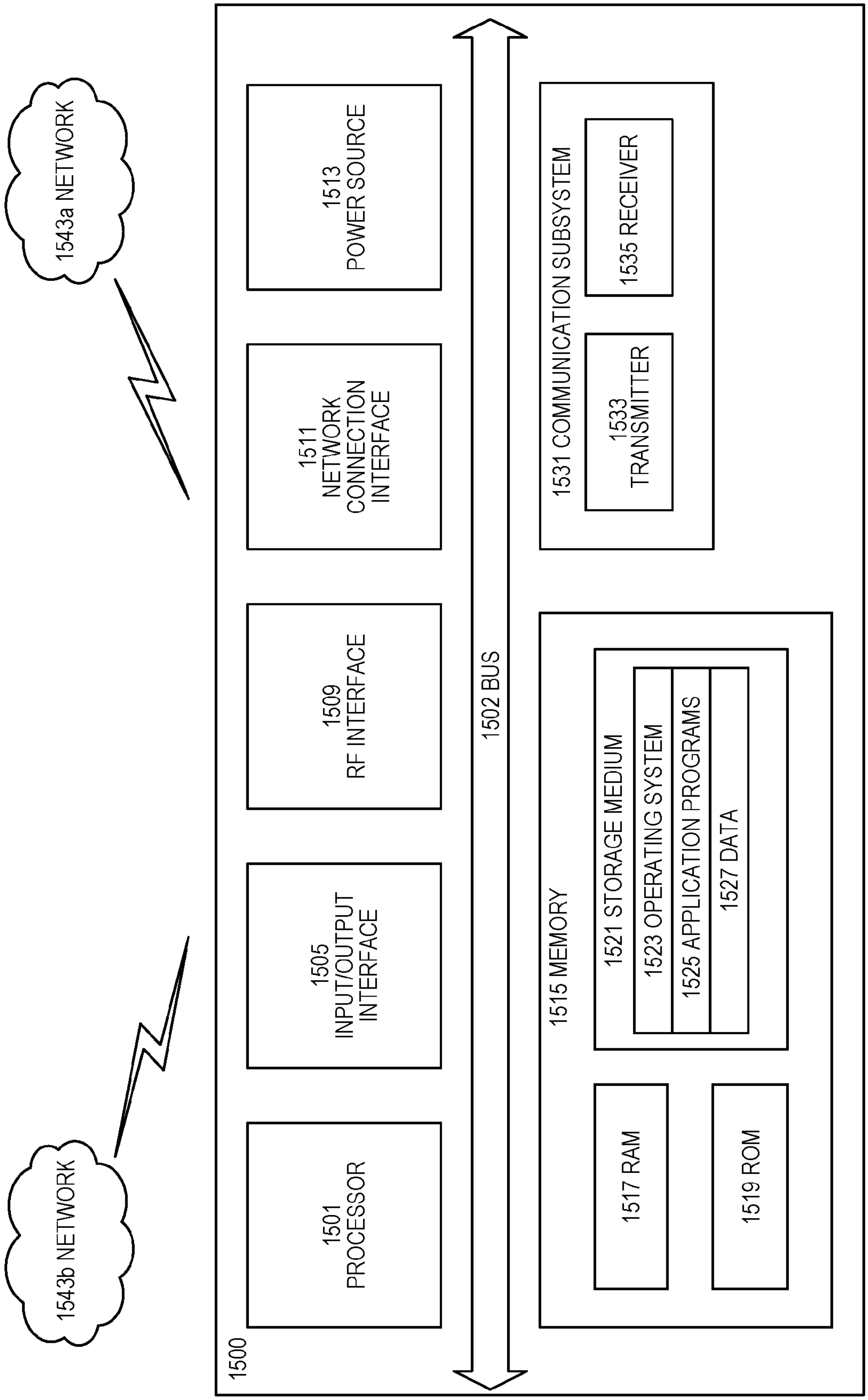
FIG. 10 is a block diagram of an exemplary user equipment (UE) configurable according to various exemplary embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1500 can be any UE identified by the 3rd Generation Partnership Project (3GPP), including a NB-IoT UE, a machine type communication (MTC) UE, and/or an enhanced MTC (eMTC) UE. UE 1500, as illustrated in FIG. 10, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE can be used interchangeable. Accordingly, although FIG. 10 is a UE, the components discussed herein are equally applicable to a wireless device, and vice-versa.

In FIG. 10, UE 1500 includes processing circuitry 1501 that is operatively coupled to input/output interface 1505, radio frequency (RF) interface 1509, network connection interface 1511, memory 1515 including random access memory (RAM) 917, read-only memory (ROM) 919, and storage medium 921 or the like, communication subsystem 931, power source 933, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software, or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 10, processing circuitry 1501 can be configured to communicate with network 1543*b* using communication subsystem 1531. Network 1543*a* and network 1543*b* can be the same network or networks or different network or networks. Communication subsystem 1531 can be configured to include one or more transceivers used to communicate with network 1543*b*. For example, communication subsystem 1531 can be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software, or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543*b* can encompass wired and/or wireless networks such as a local-area network (LAN), a wide-area network (WAN), a computer network, a wireless network, a telecommunications network, another like network or any combination thereof. For example, network 1543*b* can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software, or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 11:
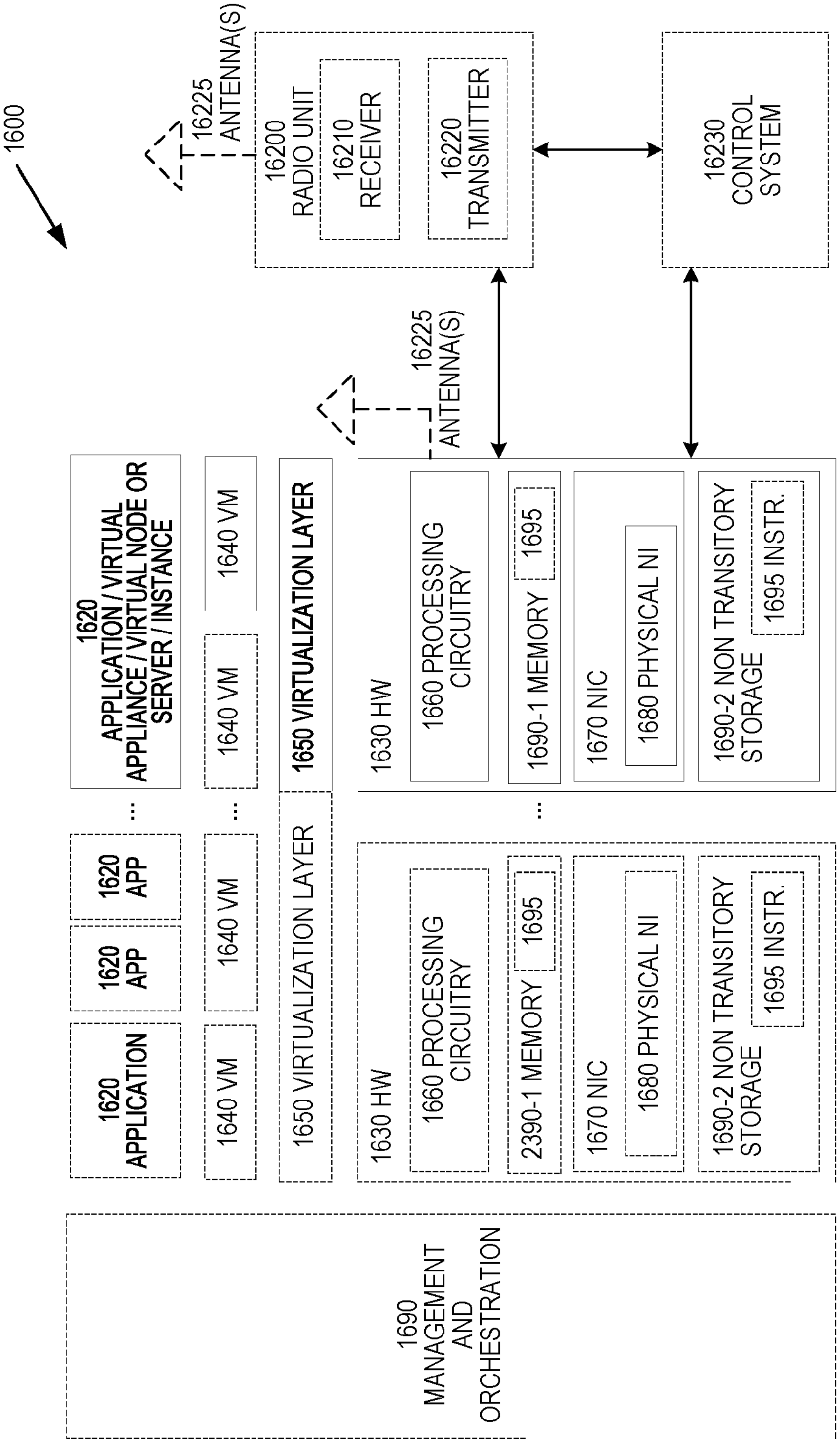
FIG. 11 is a block diagram of illustrating a virtualization environment that can facilitate virtualization of various functions implemented according to various exemplary embodiments of the present disclosure.

FIG. 11 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 11, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 1690, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

In the context of NFV, Virtual Network Function (VNF) is responsible for handling specific network functions that run in one or more virtual machines 1640 on top of hardware networking infrastructure 1630, and can correspond to application 1620 in FIG. 11.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signaling can be affected with the use of control system 16230 which can alternatively be used for communication between the hardware nodes 1630 and radio units 16200.

Figure 12:
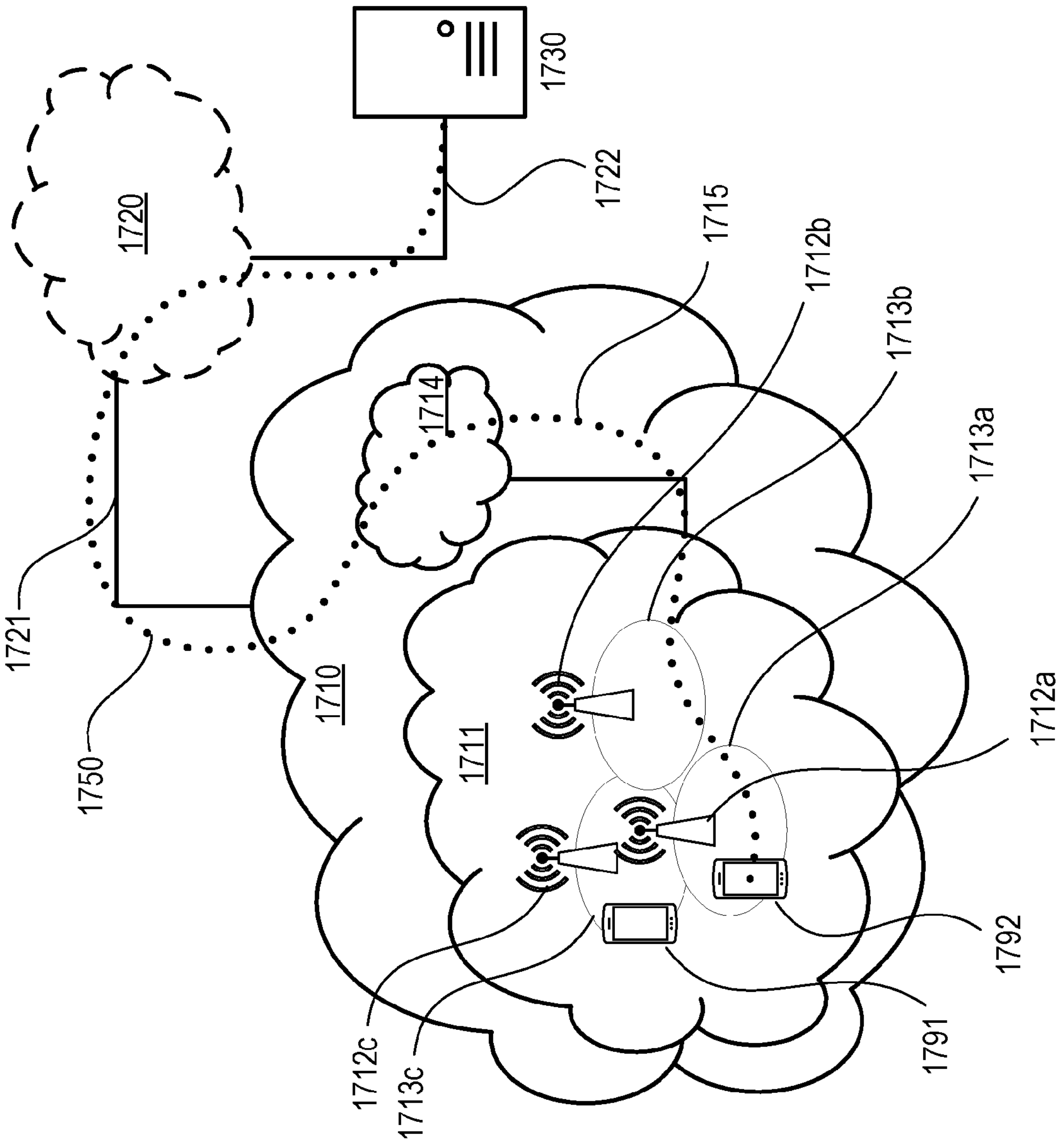
FIG. 12 is a block diagram of an exemplary communication system configurable according to various exemplary embodiments of the present disclosure.

With reference to FIG. 12, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* can be configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 12 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

EXAMPLE EMBODIMENTS

Embodiments of the presently disclosed techniques and apparatuses include, but are not limited to, the following examples:

1. A method, performed by a device operating in a wireless network, the method comprising:
   - determining that a receive-to-transmit or transmit-to-receive switching limitation of a user equipment, UE, cannot or is likely not to be met during a dual-active protocol stack, DAPS, handover for the UE from a source cell to a target cell; and
   - taking one or more mitigation actions in response to said determining.
2. The method of example embodiment 1, wherein the device is the UE.
3. The method of example embodiment 2, wherein said determining comprises determining that an downlink-to-uplink switching limitation of the UE cannot or is likely not to be met, and wherein taking one or more mitigation actions comprises one of:
   - stopping early a downlink reception from the later of any scheduled receptions in the downlink interval from either or both of the source and target cells;
   - skipping the later of any scheduled receptions in the downlink interval from either or both of the source and target cells;
   - starting late the earliest of any scheduled transmission in the uplink interval to either or both of the source and target cells; and
   - skipping the earliest of any scheduled transmission to either or both of the source and target cells in the uplink interval.
4. The method of example embodiment 2 or 3, wherein said determining comprises determining, for a given downlink interval and immediately succeeding uplink interval, that there is a constraint on downlink-to-uplink switching by:
   - determining the latest ending time for scheduled reception by the UE in the downlink interval of transmissions from either or both of the source cell and target cell for the DAPS handover;
   - determining the earliest starting time for scheduled transmission by the UE in the uplink interval to either or both of the source cell and target cell for the DAPS handover; and
   - determining that the difference between said latest ending time and said earliest starting time is less than a predetermined minimum downlink-to-uplink switching time for the UE.
5. The method of example embodiment 4, wherein determining the earliest starting time takes into account a timing advance corresponding to each of the source cell and the target cell and a configured guard period for downlink-to-uplink switching.
6. The method of example embodiment 2, wherein said determining comprises determining that an uplink-to-downlink switching limitation of the UE cannot or is likely not to be met, and wherein said taking one or more mitigation actions comprises one of:
   - stopping early the later of any scheduled transmission in the uplink interval to either or both of the source and target cells;
   - skipping the later of any scheduled transmission in the uplink interval to either or both of the source and target cells;
   - starting late the earliest of any scheduled receptions in the downlink interval from either or both of the source and target cells; and
   - skipping the earliest of any scheduled receptions in the downlink interval from either or both of the source and target cells.
7. The method of example embodiment 2 or 6, wherein said determining comprises determining, for a given uplink interval and immediately succeeding downlink interval, that there is a constraint on uplink-to-downlink switching by:
   - determining the earliest starting time for scheduled reception by the UE in the downlink interval of transmissions from either or both of the source cell and target cell for the DAPS handover;
   - determining the latest ending time for scheduled transmission by the UE in the uplink interval to either or both of the source cell and target cell for the DAPS handover; and
   - determining that the difference between said earliest starting time and said latest ending time is less than a predetermined minimum uplink-to-downlink switching time for the UE.

8. The method of example embodiment 7, wherein determining the latest ending time takes into account a timing advance corresponding to each of the source cell and the target cell.

9. The method of any of example embodiments 2-8, wherein taking one or more mitigation actions comprises sending, to the wireless network, an indication that a receive-to-transmit or transmit-to-receive switching limitation of the UE cannot or is likely not to be met during a DAPS handover for the UE from the source cell to the target cell.

10. The method of example embodiment 1, wherein the device is a network node.

11. The method of example embodiment 10, wherein said determining comprises determining, for a given downlink interval and immediately succeeding uplink interval, that there is a constraint on downlink-to-uplink switching of the UE by:

- estimating the latest ending time for scheduled reception by the UE in the downlink interval of transmissions from either or both of the source cell and target cell for the DAPS handover;
- estimating the earliest starting time for scheduled transmission by the UE in the uplink interval to either or both of the source cell and target cell for the DAPS handover; and
- determining that the difference between said latest ending time and said earliest starting time is less than a predetermined minimum downlink-to-uplink switching time for the UE.

12. The method of example embodiment 11, wherein estimating the earliest starting time takes into account an estimated timing advance for each of the source cell and the target cell.

13. The method of example embodiment 12, wherein the method comprises estimating the timing advance for the source cell based on an accumulation of timing advance commands sent to the UE by the source cell.

14. The method of example embodiment 11, wherein estimating the earliest starting time takes into account a timing advance reported by the UE for either or each of the source cell and the target cell.

15. The method of example embodiment 11, wherein estimating the earliest starting time takes into account a receive timing difference reported by the UE.

16. The method of example embodiment 11, wherein estimating the earliest starting time takes into account a timing alignment error (TAE) corresponding to the source and target cells.

17. The method of example embodiment 10, wherein said determining comprises determining, for a given uplink interval and immediately succeeding downlink interval, that there is a constraint on uplink-to-downlink switching by:

- estimating the earliest starting time for scheduled reception by the UE in the downlink interval of transmissions from either or both of the source cell and target cell for the DAPS handover;
- estimating the latest ending time for scheduled transmission by the UE in the uplink interval to either or both of the source cell and target cell for the DAPS handover; and
- determining that the difference between said earliest starting time and said latest ending time is less than a predetermined minimum uplink-to-downlink switching time for the UE.

18. The method of example embodiment 17, wherein estimating the latest ending time takes into account an estimated timing advance for each of the source cell and the target cell.

19. The method of example embodiment 18, wherein the method comprises estimating the timing advance for the source cell based on an accumulation of timing advance commands sent to the UE by the source cell.

20. The method of example embodiment 17, wherein estimating the latest ending time takes into account a timing advance reported by the UE for either or each of the source cell and the target cell.

21. The method of example embodiment 17, wherein estimating the earliest starting time takes into account a receive timing difference reported by the UE.

22. The method of example embodiment 17, wherein estimating the earliest starting time takes into account a timing alignment error (TAE) corresponding to the source and target cells.

23. The method of any one of example embodiments 10-22, wherein said taking one or more mitigation actions comprises one or more of any of:

- adjusting a scheduling of a downlink transmission to the UE;
- adjusting a scheduling of an uplink transmission from the UE; and
- adjusting a timing advance for the UE to the source cell and/or the target cell.

24. The method of any one of example embodiments 10-22, wherein said taking one or more mitigation actions comprises determining not to initiate a DAPS handover for the UE.

25. The method of any of example embodiments 1-24, wherein taking the one or more mitigation actions is further responsive to evaluating priorities of one or more scheduled uplink transmissions by the UE and/or one or more scheduled downlink transmissions to the UE.

26. A user equipment, UE, for operation in a wireless network, the UE being adapted to carry out a method according to any one of example embodiments 1-9 and 25.

27. A user equipment, UE, for operation in a wireless network, the UE comprising:

- radio circuitry configured to communicate with the wireless network; and
- processing circuitry operatively connected to the radio circuitry and configured to cause the UE to carry out a method according to any one of example embodiments 1-9 and 25.

28. A computer program product comprising program instructions for execution by a processing circuit in a user equipment, UE, the program instructions being configured to cause the UE to carry out a method according to any one of example embodiments 1-9 and 25.

29. A computer-readable medium comprising, stored thereupon, the computer program product of example embodiment 28.

30. A network node for operation in a wireless network, the network node being adapted to carry out a method according to any one of example embodiments 10-25.

31. A network node for operation in a wireless network, the network node comprising:

- radio circuitry configured to communicate with a user equipment, UE; and
- processing circuitry operatively connected to the radio circuitry and configured to cause the network node to carry out a method according to any one of example embodiments 10-25.

32. A computer program product comprising program instructions for execution by a processing circuit in a network node, the program instructions being configured to cause the network node to carry out a method according to any one of example embodiments 10-25.

33. A computer-readable medium comprising, stored thereupon, the computer program product of example embodiment 32.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. In addition, certain terms used in the present disclosure, including the specification, drawings and exemplary embodiments thereof, can be used synonymously in certain instances, including, but not limited to, e.g., data and information. It should be understood that while these words and/or other words that can be synonymous to one another can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A method, performed by a user equipment (UE) operating in a wireless network, the method comprising:

determining whether a receive-to-transmit or transmit-to-receive switching limitation of the UE for time-division duplexing (TDD) can be met during a dual-active protocol stack handover for the UE from a source cell to a target cell; and autonomously taking one or more mitigation actions in response to said determining.

2. The method of claim 1, wherein said determining comprises determining whether a receive-to-transmit switching limitation of the UE can be met, for a given downlink interval and immediately succeeding uplink interval, and wherein taking one or more mitigation actions comprises one of:

stopping early a downlink reception from the later of any scheduled receptions in the downlink interval from either or both of the source and target cells;

skipping the later of any scheduled receptions in the downlink interval from either or both of the source and target cells;

starting late the earliest of any scheduled transmission in the uplink interval to either or both of the source and target cells; and skipping the earliest of any scheduled transmission to either or both of the source and target cells in the uplink interval.

3. The method of claim 1, wherein said determining comprises determining, for a given downlink interval and immediately succeeding uplink interval, that there is a constraint on receive-to-transmit switching by:

determining the latest ending time for scheduled reception by the UE in the downlink interval of transmissions from either or both of the source cell and target cell for the dual-active protocol stack handover;

determining the earliest starting time for scheduled transmission by the UE in the uplink interval to either or both of the source cell and target cell for the dual-active protocol stack handover; and determining that the difference between said latest ending time and said earliest starting time is less than a predetermined minimum downlink-to-uplink switching time for the UE.

4. The method of claim 3, wherein determining the earliest starting time takes into account a timing advance corresponding to each of the source cell and the target cell and/or a configured guard period for downlink-to-uplink switching.

5. The method of claim 1, wherein said determining comprises determining whether an transmit-to-receive switching limitation of the UE can be met, and wherein said taking one or more mitigation actions comprises one of:

stopping early the later of any scheduled transmission in the uplink interval to either or both of the source and target cells;

skipping the later of any scheduled transmission in the uplink interval to either or both of the source and target cells;

starting late the earliest of any scheduled receptions in the downlink interval from either or both of the source and target cells; and skipping the earliest of any scheduled receptions in the downlink interval from either or both of the source and target cells.

6. The method of claim 5, wherein said determining comprises determining, for a given uplink interval and immediately succeeding downlink interval, that there is a constraint on transmit-to-receive switching by:

determining the earliest starting time for scheduled reception by the UE in the downlink interval of transmissions from either or both of the source cell and target cell for the dual-active protocol stack handover;

determining the latest ending time for scheduled transmission by the UE in the uplink interval to either or both of the source cell and target cell for the dual-active protocol stack handover; and determining that the difference between said earliest starting time and said latest ending time is less than a predetermined minimum uplink-to-downlink switching time for the UE.

7. The method of claim 6, wherein determining the latest ending time takes into account a timing advance corresponding to each of the source cell and the target cell.

8. The method of claim 1, wherein taking one or more mitigation actions comprises sending, to the wireless network, an indication of whether a receive-to-transmit or transmit-to-receive switching limitation of the UE can be met during a dual-active protocol stack handover for the UE from the source cell to the target cell.

9. The method of claim 1, wherein said determining whether there is a constraint on receive-to-transmit switching or transmit-to-receive switching by the UE takes into account an enhanced switching-time capability of the UE.

10. The method of claim 1, wherein taking the one or more mitigation actions is further responsive to evaluating priorities of one or more scheduled uplink transmissions by the UE and/or one or more scheduled downlink transmissions to the UE.

11. A user equipment (UE) for operation in a wireless network, the UE comprising:

radio circuitry configured to communicate with the wireless network; and processing circuitry operatively connected to the radio circuitry and configured to cause the UE to carry out a method according to claim 1.

12. A method, performed by a network node operating in a wireless network, the method comprising:

determining whether there is a constraint on downlink-to-uplink switching or uplink-to-downlink switching by a user equipment (UE) during a dual-active protocol stack handover of the UE from a source cell to a target cell; and taking action based on said determination, said action comprising at least one of:

adjusting a scheduling of a downlink transmission to the UE;

adjusting a scheduling of an uplink transmission from the UE;

adjusting a timing advance for the UE to the source cell and/or the target cell; and determining whether to initiate the handover for the UE.

13. The method of claim 12, wherein the method comprises receiving, from the UE, an indication of whether a receive-to-transmit or transmit-to-receive switching limitation of the UE can be met during a dual-active protocol stack handover for the UE from the source cell to the target cell, wherein said determining is based on said indication.

14. The method of claim 12, wherein said determining comprises determining, for a given downlink interval and immediately succeeding uplink interval, that there is a constraint on receive-to-transmit switching by the UE by:

estimating the latest ending time for scheduled reception by the UE in the downlink interval of transmissions from either or both of the source cell and target cell for the dual-active protocol stack handover;

estimating the earliest starting time for scheduled transmission by the UE in the uplink interval to either or both of the source cell and target cell for the dual-active protocol stack handover; and determining that the difference between said latest ending time and said earliest starting time is less than a predetermined minimum downlink-to-uplink switching time for the UE.

15. The method of claim 14, wherein estimating the earliest starting time takes into account one of:

an estimated timing advance for each of the source cell and the target cell;

a timing advance reported by the UE for either or each of the source cell and the target cell;

a receive timing difference reported by the UE;

a timing alignment error (TAE) corresponding to the source and target cells; and, a configured guard period for downlink-to-uplink switching.

16. The method of claim 15, wherein the method comprises estimating the timing advance for the source cell based on an accumulation of timing advance commands sent to the UE by the source cell.

17. The method of claim 16, wherein estimating the earliest starting time takes into account one of:

a receive timing difference reported by the UE; and a timing alignment error (TAE) corresponding to the source and target cells.

18. The method of claim 12, wherein said determining comprises determining, for a given uplink interval and immediately succeeding downlink interval, that there is a constraint on transmit-to-receive switching by the UE by:

estimating the earliest starting time for scheduled reception by the UE in the downlink interval of transmissions from either or both of the source cell and target cell for the dual-active protocol stack handover;

estimating the latest ending time for scheduled transmission by the UE in the uplink interval to either or both of the source cell and target cell for the dual-active protocol stack handover; and determining that the difference between said earliest starting time and said latest ending time is less than a predetermined minimum uplink-to-downlink switching time for the UE.

19. The method of claim 18, wherein estimating the latest ending time takes into account one of:

an estimated timing advance for each of the source cell and the target cell; and a timing advance reported by the UE for either or each of the source cell and the target cell.

20. The method of claim 18, wherein the method comprises estimating the timing advance for the source cell based on an accumulation of timing advance commands sent to the UE by the source cell.

21. A network node for operation in a wireless network, the network node comprising:

radio circuitry configured to communicate with a user equipment, UE; and processing circuitry operatively connected to the radio circuitry and configured to cause the network node to carry out a method according to claim 12.

* * * * *